(12) United States Patent
Wei

(10) Patent No.: US 12,369,211 B2
(45) Date of Patent: Jul. 22, 2025

(54) FREQUENCY BAND CONTROL METHOD IN ABNORMAL SCENARIO OF DUAL-CARD TERMINAL AND TERMINAL DEVICE

(71) Applicant: Honor Device Co., Ltd., Shenzhen (CN)

(72) Inventor: Zhenrong Wei, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 307 days.

(21) Appl. No.: 18/001,123

(22) PCT Filed: Mar. 17, 2022

(86) PCT No.: PCT/CN2022/081445
§ 371 (c)(1),
(2) Date: Dec. 8, 2022

(87) PCT Pub. No.: WO2022/242288
PCT Pub. Date: Nov. 24, 2022

(65) Prior Publication Data
US 2023/0217520 A1    Jul. 6, 2023

(30) Foreign Application Priority Data
May 20, 2021    (CN) .......................... 202110552739.3

(51) Int. Cl.
*H04W 76/15*    (2018.01)
*H04L 5/00*    (2006.01)
(Continued)

(52) U.S. Cl.
CPC .......... *H04W 76/15* (2018.02); *H04L 5/0098* (2013.01); *H04W 48/18* (2013.01); *H04W 88/06* (2013.01)

(58) Field of Classification Search
CPC ..... H04W 76/15; H04W 48/18; H04W 88/06; H04L 5/0098
(Continued)

(56) References Cited

U.S. PATENT DOCUMENTS 9,445,276 B2    9/2016    Krishnamoorthy et al.
11,369,003 B2    6/2022    Singh et al.
(Continued)

FOREIGN PATENT DOCUMENTS

CN    107820332 A    3/2018
CN    110166074 A    8/2019
(Continued)

OTHER PUBLICATIONS

China Telecom, "Discussion on Multi-SIM enhancement for dual TX/ dual Rx devices in Rel-18," 3GPP TSG RAN Meeting #91e, RP-210432, E-meeting, Mar. 16-26, 2021, 4 pages.

*Primary Examiner* — Ahmad F. Matar
*Assistant Examiner* — Jirapon Tulop
(74) *Attorney, Agent, or Firm* — Conley Rose, P.C.

(57) ABSTRACT

A frequency band control method in an abnormal scenario of a dual-card terminal and a terminal device. For a dual-card user scenario that supports a 5G SA mode or a 5G NSA mode, it is determined whether a frequency band combination of two cards belongs to a preset frequency band combination and whether signal quality of a primary card and/or signal quality of a secondary card meet/meets a preset threshold. If the frequency band combination of the two cards belongs to the preset frequency band combination and the signal quality of the primary card and/or the signal quality of the secondary card are/is less than the preset threshold, an NR capability of a terminal device is controlled
(Continued)

to fall back, for example, an SA capability is disabled, or an NR link in an ENDC link is released, to improve the signal quality of the two cards.

20 Claims, 19 Drawing Sheets

(51) Int. Cl.
   *H04W 48/18* (2009.01)
   *H04W 88/06* (2009.01)
(58) Field of Classification Search
   USPC .......................................................... 455/418
   See application file for complete search history.

(56) References Cited

U.S. PATENT DOCUMENTS

| 2020/0196199 | A1 | 6/2020 | Sharma et al. |
| 2021/0120524 | A1 | 4/2021 | Palle et al. |

FOREIGN PATENT DOCUMENTS

| CN | 110677867 | A | | 1/2020 | | |
| CN | 111372327 | A | * | 7/2020 | ............ | H04W 76/12 |
| CN | 111988775 | A | | 11/2020 | | |
| CN | 112714431 | A | * | 4/2021 | ............ | H04W 8/183 |
| CN | 112788713 | A | * | 5/2021 | | |
| CN | 113891452 | A | | 1/2022 | | |
| WO | 2015175139 | A1 | | 11/2015 | | |
| WO | 2021011310 | A1 | | 1/2021 | | |
| WO | 2021072727 | A1 | | 4/2021 | | |

\* cited by examiner

FREQUENCY BAND CONTROL METHOD IN ABNORMAL SCENARIO OF DUAL-CARD TERMINAL AND TERMINAL DEVICE

CROSS-REFERENCE TO RELATED APPLICATIONS

This application is a U.S. National Stage of International Application No. PCT/CN2022/081445, which claims priority to Chinese Patent Application No. 202110552739.3, filed with the China National Intellectual Property Administration on May 20, 2021, both of which are incorporated herein by reference in their entireties.

TECHNICAL FIELD

This application relates to the field of communications technologies, and in particular, to a frequency band control method in an abnormal scenario of a dual-card terminal and a terminal device.

BACKGROUND

Currently, two subscriber identity module cards (a primary card and a secondary card) are usually installed in a dual-card terminal device, and respectively occupy different frequency bands to implement communications services. However, in the dual-card terminal device, there may be a problem of low compatibility when components cooperate with each other. Consequently, signal quality of the dual-card terminal device may be affected. For example, for a dual-card terminal device that supports a 5G standard, both a primary card and a secondary card work on a 5G frequency band, or a primary card and a secondary card respectively work on a 5G frequency band and a 4G/3G/2G frequency band. Due to hardware matching, there is incompatibility or poor compatibility between the 5G frequency band and the 5G/4G/3G/2G frequency band. Therefore, when a frequency band combination of the two cards is used, communication performance of the device deteriorates, and consequently basic experience of a user is affected.

SUMMARY

This application provides a frequency band control method in an abnormal scenario of a dual-card terminal and a terminal device, to alleviate a case in which signal quality deteriorates because a dual-card terminal device works on a problem frequency band combination.

To achieve the foregoing objective, the following technical solutions are used in this application:

According to a first aspect, this application provides a frequency band control method in an abnormal scenario of dual-card terminal. The method is applied to a terminal device. The terminal device supports a 5G standalone SA mode and/or a non-standalone NSA mode. The method includes: when an operating frequency band of a first subscriber identity module card and an operating frequency band of a second subscriber identity module card in the terminal device belong to a frequency band combination in a preset blacklist, and signal quality of the first subscriber identity module card or the second subscriber identity module card does not meet a preset signal quality condition, forbidding the terminal device from working on a 5G new radio frequency band.

The forbidding the terminal device from working on a 5G NR frequency band includes: disabling a 5G SA capability of the terminal device, and registering the terminal device with a first network if the terminal device is in the 5G SA mode, where the first network is a 4G, 3G, or 2G network; or releasing an NR link in a dual-connectivity ENDC link of the terminal device if the terminal device is in the 5G NSA mode.

In the solutions of this application, for a dual-card user scenario that supports the 5G SA mode or the 5G NSA mode, it is determined whether a frequency band combination of the two cards is in the blacklist and whether signal quality of a primary card and/or signal quality of a secondary card are/is less than a preset threshold. If the frequency band combination of the two cards is in the blacklist and the signal quality of the primary card and/or the signal quality of the secondary card are/is less than the preset threshold, an NR capability of the terminal device is controlled to fall back, for example, the SA capability is disabled, or the NR link in the ENDC link is broken, to improve the signal quality of the two cards. In this way, a case in which signal quality deteriorates because the dual-card terminal device works on a problem frequency band combination can be alleviated.

In actual implementation, blacklists that include corresponding frequency band combinations may be respectively established based on different chips and different components. The frequency band combination in the blacklist is a problem frequency band combination with relatively poor frequency band compatibility, and the signal quality of the terminal device may deteriorate when the problem frequency band combination is used. Specifically, for a 5G product, there may be a problem of incompatibility or poor compatibility between a 5G frequency band and a 5G/4G/3G/2G frequency band. In this case, a blacklist that includes a frequency band combination of 5G and 5G/4G/3G/2G may be correspondingly established.

In a possible implementation, the preset blacklist may include at least one frequency band combination, and one of the at least one frequency band combination may include a frequency band corresponding to a first network standard and a frequency band corresponding to a second network standard. The first network standard and the second network standard may be the same, for example, both are 5R NR standards. Alternatively, the first network standard and the second network standard may be different, for example, may be respectively a 5R NR standard and a 4G LTE standard.

In the blacklist, the frequency band combination may include two frequency bands, three frequency bands, or at least three frequency bands.

In the solutions of this application, it may be determined, by using the blacklist, whether an operating frequency band currently used by the dual-card terminal device is a problem frequency band combination. When the dual-card terminal device works on the problem frequency band combination and signal quality of the dual-card terminal device does not meet a condition, a corresponding policy may be executed, that is, the dual-card terminal device is forbidden from working on the 5G NR frequency band, to alleviate a case in which the signal quality deteriorates because the dual-card terminal device works on the problem frequency band combination.

Optionally, the at least one frequency band combination may include at least one of the following frequency band combinations:

NR N1 and GSM B20;
NR N1 and WCDMA B8;
NR N28 and LTE B40;
NR N78 and CDMA B2;
NR N78 and NR N3; and LTE B5 and a combination of LTE B3 and NR N41.

In a possible implementation, after the forbidding the terminal device from working on a 5G NR frequency band, the frequency band control method in an abnormal scenario of a dual-card terminal further includes:

when detecting that the operating frequency band of the first subscriber identity module card and/or the operating frequency band of the second subscriber identity module card change/changes, determining whether a changed operating frequency band of the first subscriber identity module card and a changed operating frequency band of the second subscriber identity module card belong to the frequency band combination in the preset blacklist; and when the changed operating frequency band of the first subscriber identity module card and the changed operating frequency band of the second subscriber identity module card do not belong to the frequency band combination in the preset blacklist, allowing the terminal device to work on the 5G NR frequency band.

In the solutions, after the terminal device is forbidden from working on the 5G NR frequency band, when the frequency band combination of the two cards changes and a changed frequency band combination of the two cards is not in the blacklist, the NR capability of the terminal device may be controlled to be restored, and the terminal device may be allowed to work on the 5G NR frequency band, for example, the SA capability is re-enabled, or addition of the ENDC link is allowed, to ensure the signal quality of the two cards.

Optionally, in this embodiment of this application, a whitelist may be further established, and a frequency band combination in the whitelist may be a frequency band combination with relatively high frequency band compatibility. Specifically, after the terminal device is forbidden from working on the 5G NR frequency band, if the frequency band combination of the two cards is a frequency band combination in the whitelist, the NR capability of the terminal device may be restored.

In a possible implementation, the disabling a 5G SA capability of the terminal device, and registering the terminal device with a first network if the terminal device is in the 5G SA mode includes:

when the first subscriber identity module card camps on a 5G SA network, and the second subscriber identity module card camps on the 4G, 3G, or 2G network, disabling a 5G SA capability of the first subscriber identity module card, and registering the first subscriber identity module card with the first network; or when both the first subscriber identity module card and the second subscriber identity module card camp on a 5G SA network, disabling a 5G SA capability of a target card, and registering the target card with the first network, where the target card is the first subscriber identity module card and/or the second subscriber identity module card.

Optionally, the disabling a 5G SA capability of a target card, and registering the target card with the first network includes:

disabling the 5G SA capability of the first subscriber identity module card, and registering the first subscriber identity module card with the first network;

when detecting that the operating frequency band of the first subscriber identity module card and/or the operating frequency band of the second subscriber identity module card change/changes, determining whether the operating frequency band of the first subscriber identity module card and the operating frequency band of the second subscriber identity module card still belong to the frequency band combination in the preset blacklist; and when the operating frequency band of the first subscriber identity module card and the operating frequency band of the second subscriber identity module card still belong to the frequency band combination in the preset blacklist, disabling a 5G SA capability of the second subscriber identity module card, and registering the second subscriber identity module card with the first network.

In a possible implementation, the releasing an NR link in an ENDC link of the terminal device if the terminal device is in the 5G NSA mode includes:

when the first subscriber identity module card camps on a 5G NSA network, and the second subscriber identity module card camps on the 4G, 3G, or 2G network, releasing an ENDC link corresponding to the first subscriber identity module card; or when both the first subscriber identity module card and the second subscriber identity module card camp on a 5G NSA network, releasing an NR link in an ENDC link corresponding to at least one of the first subscriber identity module card and the second subscriber identity module card.

Optionally, the releasing an ENDC link corresponding to at least one of the first subscriber identity module card and the second subscriber identity module card includes:

releasing the ENDC link corresponding to the first subscriber identity module card;

when detecting that the operating frequency band of the first subscriber identity module card and/or the operating frequency band of the second subscriber identity module card change/changes, determining whether the operating frequency band of the first subscriber identity module card and the operating frequency band of the second subscriber identity module card still belong to the frequency band combination in the preset blacklist; and when the operating frequency band of the first subscriber identity module card and the operating frequency band of the second subscriber identity module card still belong to the frequency band combination in the preset blacklist, releasing an ENDC link corresponding to the second subscriber identity module card.

In a possible implementation, after the releasing an NR link in an ENDC link of the terminal device, the frequency band control method in an abnormal scenario of a dual-card terminal further includes: forbidding the terminal device from adding a new ENDC link.

In a possible implementation, the terminal device may be registered with the first network through handover, or the terminal device may be registered with the first network through redirection.

For example, in this embodiment of this application, a 5G base station may trigger, based on a terminal capability and a network deployment status, the terminal device to fall back from the 5G SA network to an LTE network through handover (handover to LTE) or redirection (redirect to LTE). A specific manner used by the terminal device to fall back to the LTE network is determined based on the 5G SA network.

In actual implementation, the terminal device may search for the LTE network, initiate a tracking area update TAU procedure to the LTE network, and indicate that the 5G SA capability of the terminal device is disabled. The terminal device receives a TAU complete message from the first network, and the terminal device is registered with the LTE network in response to the TAU complete message.

In a possible implementation, the releasing an ENDC link of the terminal device includes: The terminal device initiates a secondary cell group SCG failure procedure to the 5G NSA network; the terminal device receives an SCG release message from the 5G NSA network; and the terminal device releases the NR link in the ENDC link in response to the SCG release message.

In a possible implementation, the allowing the terminal device to work on the 5G NR frequency band includes:
  if the terminal device is in the 5G SA mode, re-enabling the 5G SA capability of the terminal device; or
  if the terminal device is in the 5G NSA mode, allowing the terminal device to add the ENDC link.

In a possible implementation, after the re-enabling the 5G SA capability of the terminal device, the frequency band control method in an abnormal scenario of a dual-card terminal further includes: The terminal device initiates a TAU procedure to an LTE network, and indicates that the 5G SA capability of the terminal device is enabled.

In a possible implementation, after the re-enabling the 5G SA capability of the terminal device, the frequency band control method in an abnormal scenario of a dual-card terminal further includes: re-registering the terminal device with a 5G SA network through handover or redirection.

In a possible implementation, the terminal device may send a mobility update registration request to the 5G SA network; the terminal device receives a mobility update registration complete message from the 5G SA network; and the terminal device is registered with the 5G SA network in response to the mobile update registration complete message.

In a possible implementation, the first subscriber identity module card is the primary card and the second subscriber identity module card is the secondary card, or the first subscriber identity module card is the secondary card and the second subscriber identity module card is the primary card.

According to a second aspect, this application provides a frequency band control apparatus in an abnormal scenario of a dual-card terminal. The apparatus includes a unit configured to perform the method in the first aspect. The apparatus may correspondingly perform the method described in the first aspect. For related description of the unit in the apparatus, refer to the description in the first aspect. For brevity, details are not described herein.

The method described in the first aspect may be implemented by hardware, or may be implemented by executing corresponding software by hardware. The hardware or the software includes one or more modules or units corresponding to the foregoing functions, for example, a processing module or unit or a display module or unit.

According to a third aspect, this application provides a terminal device. The terminal device includes a processor, and the processor is coupled to a memory. The memory is configured to store a computer program or instructions, and the processor is configured to execute the computer program or the instructions stored in the memory, so that the method in the first aspect is performed. For example, the processor is configured to execute the computer program or the instructions stored in the memory, so that the apparatus performs the method in the first aspect.

According to a fourth aspect, this application provides a computer-readable storage medium. The computer-readable storage medium stores a computer program (which may also be referred to as an instruction or code) used to implement the method in the first aspect. For example, when the computer program is executed by a computer, the computer may be enabled to perform the method in the first aspect.

According to a fifth aspect, this application provides a chip, including a processor. The processor is configured to read and execute a computer program stored in a memory, to perform the method in the first aspect and any possible implementation of the first aspect. Optionally, the chip further includes the memory, and the memory is connected to the processor by using a circuit or an electric wire.

According to a sixth aspect, this application provides a chip system, including a processor. The processor is configured to read and execute a computer program stored in a memory, to perform the method in the first aspect and any possible implementation of the first aspect. Optionally, the chip system further includes the memory, and the memory is connected to the processor by using a circuit or an electric wire.

According to a seventh aspect, this application provides a computer program product. The computer program product includes a computer program (which may also be referred to as an instruction or code), and when the computer program is executed by a computer, the computer is enabled to implement the method in the first aspect.

It may be understood that for beneficial effects of the second aspect to the seventh aspect, refer to related description in the first aspect. Details are not described herein.

DESCRIPTION OF EMBODIMENTS

Figure 1:
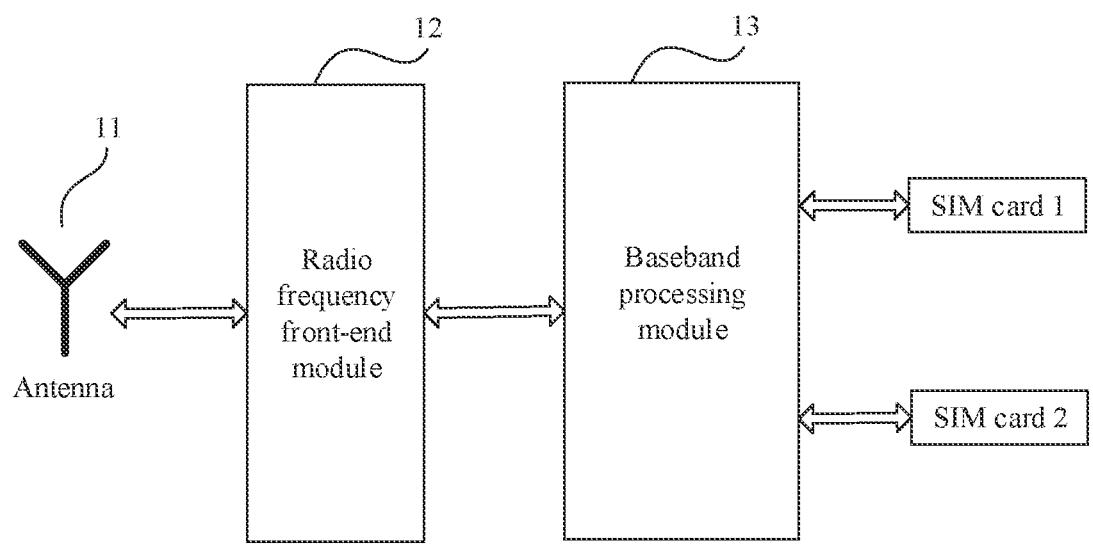
FIG. 1 is an architectural diagram of a structure of a dual-card terminal device according to an embodiment of this application.

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes an association relationship for describing associated objects, and represents that three relationships may exist. For example. A and/or B may represent the following three cases: Only A exists, both A and B exist, and only B exists. The symbol "/" in this specification indicates an "or" relationship between associated objects. For example, A/B indicates A or B.

The terms "first", "second", and the like in this specification and the claims are used to distinguish between different objects, and are not used to describe a specific order of the objects. For example, a first subscriber identity module card and a second subscriber identity module card are used to distinguish between different subscriber identity module cards, and are not used to describe a specific order of the subscriber identity module cards.

In the embodiments of this application, a word such as "example" or "for example" is used to indicate an example, an illustration, or description. Any embodiment or design solution described by using "example" or "for example" in the embodiments of this application should not be interpreted as being more preferred or having more advantages than another embodiment or design solution. Specifically, the word such as "example" or "for example" is used to present a related concept in a specific manner.

In the description of the embodiments of this application, unless otherwise stated, "a plurality of" means two or more. For example. "a plurality of processing units" means two or more processing units, and "a plurality of elements" means two or more elements.

The technical solutions in the embodiments of this application may be applied to various communications systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, LTE time division duplex (time division duplex, TDD), a universal mobile telecommunication system (universal mobile telecommunication system, UMTS), a worldwide interoperability for microwave access (worldwide interoperability for microwave access, WiMAX) communications system, a 5G system, or new radio (new radio, NR).

A terminal device includes a device that provides voice and/or data connectivity for a user. Specifically, the terminal device includes a device that provides voice for the user, includes a device that provides data connectivity for the user, or includes a device that provides voice and data connectivity for the user. For example, the terminal device may include a handheld device with a wireless connection function or a processing device connected to a wireless modem. The terminal device may communicate with a core network device by using a radio access network (radio access network, RAN) device, and exchange voice or data with a RAN, or exchange voice and data with a RAN. The terminal device may include user equipment (user equipment, UE), a wireless terminal device, a mobile terminal device, a device-to-device (device-to-device, D2D) terminal device, a vehicle to everything (vehicle to everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer that includes a mobile terminal device, or a portable, pocket-sized, handheld, computer-built-in mobile apparatus. For example, the terminal device includes a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may further include a limited device, for example, a device with low power consumption, a device with a limited storage capability, or a device with a limited computing capability. For example, the terminal device includes an information sensing device, for example, a barcode, radio frequency identification (radio frequency identification, RFID), a sensor, a global positioning system (global positioning system, GPS), or a laser scanner. In the embodiments of this application, the terminal device may further include a relay (relay). Alternatively, it may be understood that any device that can perform data communication with a base station may be considered as the terminal device.

In the embodiments of this application, an apparatus used to implement a function of the terminal device may be the terminal device, or may be an apparatus that can support the terminal device in implementing the function, for example, a chip system. The apparatus may be installed in the terminal device. In the embodiments of this application, the chip system may include a chip, or may include a chip and another discrete component. In the technical solutions provided in the embodiments of this application, the technical solutions provided in the embodiments of this application are described by using an example in which an apparatus used to implement a function of a terminal is a terminal device.

A network device in the embodiments of this application may be a device that can provide a random access function for the terminal device or a chip that may be disposed in the device. The device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (home evolved Node B or home Node B, HNB), a baseband unit (baseband unit, BBU), an access point (access point, AP) in a wireless fidelity (wireless fidelity, WIFI) system, a wireless relay node, a wireless backhaul node, a transmission point (transmission point, TP), a transmission and reception point (transmission and reception point, TRP), or the like, may be a 5G base station (gNB) or a transmission point (TRP or TP) in a fifth generation (the fifth generation, 5G) system such as new radio (new radio, NR) or one or a group of antenna panels (including a plurality of antenna panels) of a base station in a 5G system, or may be a network node that form a gNB or a transmission point, for example, a baseband unit (BBU) or a distributed unit (distributed unit, DU). The 5G base station may include various forms of macro base stations, micro base stations, relay stations, access points, and the like. A name of a device with a base station function may vary with a system that uses a different radio access technology.

In some deployments, the gNB may include a centralized unit (centralized unit, CU) and a distributed unit (distributed unit, DU). The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions and related functions of radio frequency processing and an active antenna. Information of the RRC layer eventually becomes information of the PHY layer, or is obtained by converting information of the PHY layer. Therefore, in this architecture, higher layer signaling such as RRC layer signaling may be considered as being sent by the DU or sent by the DU and the AAU. It may be understood that the network device may be a device including one or more of a CU node, a DU node, and an AAU node. In addition, the CU may be classified into a network device in a RAN, or the CU may be classified into a network device in a core network (core network, CN). This is not limited in this application.

To help a person skilled in the art understand the embodiments of this application, the following describes some terms in the embodiments of this application.

(1) Dual-Card Terminal Device

Two subscriber identity module (subscriber identity module, SIM) cards are installed in the dual-card terminal device. One SIM card may be considered as a primary SIM card, and the other SIM card may be considered as a secondary SIM card. The dual-card terminal device may be a dual SIM dual standby (dual SIM dual standby, DSDS) terminal device or a dual SIM dual active device. For ease of description, both the SIM card and an evolution thereof are collectively referred to as the SIM card in the embodiments of this application. For example, in some embodiments, the SIM card may be a universal subscriber identity module (universal subscriber identity module, USIM) card or an eSIM card. For ease of description, description is provided below by using an example in which the dual-card terminal device includes a SIM card 1 and a SIM card 2.

The SIM card may include subscriber information such as an international mobile subscriber identity (international mobile subscriber identity, IMSI) or a temporary mobile subscriber identity (temporary mobile subscriber identity, TMSI), which is used for user identification. From a perspective of a network side, different SIM cards logically correspond to different communications entities on the network side. For example, for the network side, the dual-card terminal device may be considered as two communications entities or two user equipments.

It should be noted that the two SIM cards in the dual-card terminal device may be served by a same operator or different operators. This is not limited in the embodiments of this application. In addition, in actual application, a terminal device may support at least two SIM cards. This may be specifically determined based on an actual use requirement, is not limited in the embodiments of this application.

(2) SA Networking and NSA Networking

In 3GPP, two solutions are defined for 5G new radio (new radio, NR) networking: standalone (standalone, SA) networking and non-standalone (non-standalone, NSA) networking. NSA networking means that 4G independently deploys a control plane (a 4G network carries control signaling), and 5G and 4G jointly deploy a user plane (both a 5G network and the 4G network carry user plane data), or 5G independently deploys a user plane (only a 5G network carries user plane data). SA networking means that 5G independently deploys a control plane and a user plane, in other words, a 5G network independently carries control signaling and user plane data.

An SA network is a 5G network in which networking is performed in an SA networking mode. An NSA network is a 5G network in which networking is performed in an NSA networking mode. There are various types of networks and terminals. Therefore, currently, a 5G cell or terminal supports only NSA, only SA, or both NSA and SA.

In a power-on attach scenario or a mobility update registration scenario, when sending a user access request or a registration request to a network, the terminal device reports a 5G capability to the network, for example, adds network capability information to a capability (capability) field to indicate whether the terminal device supports the NSA mode and/or the SA mode. Correspondingly, the network may determine, based on the network capability information, whether the terminal device supports the NSA mode and/or the SA mode.

When a deployment mode in a 5G system (5G system, 5GS) is the SA mode, the 5GS includes a 5G base station and a 5G core network (5G core network, 5GC), and the 5G base station is connected to the 5GC.

The 5G base station may be a next generation NodeB (next generation NodeB, gNB). The gNB may be connected to the terminal device, and communicate with the terminal device 800 by using a new radio (new radio, NR) access technology, in other words, the gNB communicates with the terminal device by using an NR link.

The 5GC is configured to exchange, forward, connect, and route data. A network element in the 5GC is a functional virtual unit, and may include but is not limited to a unit for an access and mobility management function (access and mobility management function, AMF), a unit for a session management function (session management function, SMF), a unit for unified data management (unified data management, UDM), and the like.

When a deployment mode in a 5G system (5G system, 5GS) is the NSA mode, the terminal device may establish an ENDC link with a 4G base station and a 5G base station.

The 4G base station may be an evolved NodeB (evolved Node B, eNB). In the embodiments of this application, the terminal device may be connected to the 4G base station, and communicate with the 4G base station by using an LTE link.

The 4G base station is connected to a 4G evolved packet core (evolved packet core, EPC). The EPC mainly includes the following network elements: a mobility management entity (mobility management entity. MME), a serving gateway (serving gateway, SGW), a packet data network gateway (packet data network gateway, PGW), a home subscriber server (home subscriber server, HSS), an application server, and the like. Main functions of the MME include access control, mobility management, attachment and de-attachment, session management (for example, bearer establishment, modification, and release), and the like. The SGW is mainly configured to route and forward a data packet. Main functions of the PGW include user-based packet filtering, a lawful interception function, an IP address allocation function, and the like. The HSS is configured to store subscription information of a user, subscription data of the user, location information of a mobile user, and the like.

(3) ENDC Link (E-UTRA-NR Dual Connectivity, ENDC)

Currently, in an NSA mode, a terminal device establishes dual connectivity that is referred to as an ENDC link with a 4G base station and a 5G base station. That is, the 4G base station is used as a primary base station to transmit signaling, and the 5G base station is used as an extended and enhanced data transmission channel, to increase a data transmission rate. In this case, an LTE base station eNB is a master node (master node, MN), and an NR base station gNB is a secondary node (secondary node, SN); and an LTE cell is a master cell group (master cell group, MCG), and an NR cell is a secondary cell group (secondary cell group, SCG).

E-UTRA (evolved-UMTS terrestrial radio access, evolved UMTS terrestrial radio access) corresponds to a 4G network.

(4) Network Registration

To obtain a service provided by a network, a terminal device first needs to be registered with the network, in other words, registered to access the network. Usually, network registration may be classified into the following two types:
- (a) Initial registration: Initial registration is triggered when the terminal device is powered on. For example, if the terminal device is currently located in a 5G SA network, when the terminal device is powered on, the terminal device is registered with the 5G SA network, to implement initial registration.
- (b) Mobility update registration (which is also referred to as mobility registration): When the terminal device leaves a current registration area to enter a new tracking area (tracking area, TA), the terminal device may initiate a tracking area update (tracking area update, TAU) procedure, to perform mobility update registration. For example, when the terminal device moves from a currently registered LTE network to a 5G SA network, the terminal device is registered with the 5G SA network, to implement mobility update registration.

FIG. 1 is a schematic diagram of a structure of a dual-card terminal device according to an embodiment of this application. As shown in FIG. 1, the dual-card terminal device may include an antenna 11, a radio frequency front-end module 12 (for example, a radio frequency chip), a baseband processing module 13 (for example, a baseband chip), a SIM card 1, and a SIM card 2. It should be noted that components shown in FIG. 1 do not constitute a specific limitation on the terminal device, and the terminal device may include more or fewer components than those shown in the figure. For example, the terminal device may include a power amplification module, a radio frequency back-end module, and a storage module. For ease of description, the modules are not shown in FIG. 1.

Based on the structure shown in FIG. 1, there is low compatibility between the modules (for example, the radio frequency chip and the baseband chip) or there is a circuit problem when the modules cooperate with each other for configuration, and therefore signal quality of the dual-card terminal device is affected. For example, for a 5G product, due to hardware matching, there is a problem of incompatibility or poor compatibility between a 5G frequency band and a 5G/4G/3G/2G frequency band for the dual-card terminal device. After a frequency band of a primary card and a frequency band of a secondary card are combined, overall performance deteriorates. A frequency band combination of the primary card and the secondary card that causes deterioration of the overall performance is referred to as a problem frequency band combination below. In a scenario of the problem frequency band combination, signal quality of the primary card and/or signal quality of the secondary card in the dual-card terminal device may be affected and deteriorate/deteriorates, and consequently basic experience of a user is affected.

In view of this, this application provides a frequency band control method in an abnormal scenario of a dual-card terminal. In a process of using a dual-card terminal device that supports a 5G SA mode or a 5G NSA mode, when a frequency band combination of two cards is in a blacklist and signal quality of a primary card and/or signal quality of a secondary card do/does not meet a preset signal quality condition, an NR capability of the terminal device is controlled to fall back, for example, an SA capability is disabled, or an ENDC link is broken and addition of the ENDC link is forbidden (suppressed), to improve the signal quality of the secondary card. Further, when the frequency band combination of the two cards changes and a changed frequency band combination of the two cards is not in the blacklist, the NR capability of the terminal device is controlled to be restored, for example, the SA capability is re-enabled, or suppression of addition of the ENDC link is stopped, to ensure the signal quality of the two cards, so as to avoid a problem that basic experience of a user is affected due to a problem frequency band combination.

It should be noted that in the embodiments of this application, that signal quality of a primary card and/or signal quality of a secondary card do/does not meet a preset signal quality condition means that the signal quality of the primary card is less than a preset threshold of the primary card or the signal quality of the secondary card is less than a preset threshold of the secondary card, or that the signal quality of the primary card is less than a preset threshold of the primary card and the signal quality of the secondary card is less than a preset threshold of the secondary card. For ease of description, the method provided in the embodiments of this application is described below by using an example in which the signal quality of the secondary card is less than the preset threshold of the secondary card.

In the embodiments of this application, for a terminal device that supports 5G, different NR capability fallback solutions may be used based on different 5G modes (an NSA mode or an SA mode). A specific solution is as follows:

(1) A Blacklist that Includes a Frequency Band Combination is Established

First, blacklists that include corresponding frequency band combinations are respectively established based on different chips and different components. The frequency band combination in the blacklist is a problem frequency band combination with relatively poor frequency band compatibility, and signal quality of the terminal device may deteriorate when the problem frequency band combination is used. For example, a form of a blacklist in Table 1 is used for representation. Specifically, for a 5G product, there is a problem of incompatibility or poor compatibility between a 5G frequency band and a 5G/4G/3G/2G frequency band. In this case, a blacklist that includes a frequency band combination of 5G and 5G/4G/3G/2G may be correspondingly established, as shown in Table 1.

TABLE 1

| Index | Frequency band combination | |
| --- | --- | --- |
| (index) | Standard + frequency band 1 | Standard + frequency band 2 |
| 1 | NR N1 | GSM B20 |
| 2 | NR N1 | WCDMA B8 |
| 3 | NR N28 | LTE B40 |
| 4 | NR N78 | CDMA B2 |
| 5 | NR N78 | NR N3 |
| 6 | LTE B3 + NR N41 | LTE B5 |
| ... | ... | ... |

As shown in Table 1, in the blacklist, the frequency band combination may include two frequency bands, for example, a frequency band 1 in a network standard 1 and a frequency band 2 in a network standard 2. The network standard 1 and the network standard 2 may be a same network standard. For example, both the network standard 1 and the network standard 2 are NR. Alternatively, the network standard 1 and the network standard 2 may be different network standards. For example, the network standard 1 is NR, and the network standard 2 is LTE/WCDMA/CDMA/GSM.

An NR network is also referred to as a 5G network, and a corresponding frequency band may be referred to as a 5G frequency band or an NR frequency band. An LTE network is also referred to as a 4G network, and a corresponding frequency band may be referred to as a 4G frequency band or an LTE frequency band. A WCDMA or CDMA network is also referred to as a 3G network, and a corresponding frequency band may be referred to as a 3G frequency band. A GSM network is also referred to as a 2G network, and a corresponding frequency band may be referred to as a 2G frequency band.

Alternatively, the frequency band combination may include three frequency bands or at least three frequency bands. This may be specifically determined based on an actual use requirement, and is not limited in the embodiments of this application.

In some embodiments, for a scenario in which a SIM card 1 is registered with a 5G SA network and a SIM card 2 is registered with a 5G SA/4G/3G/2G network, a frequency band combination of the two cards may be (1) an NR frequency band+an NR frequency band, (2) an NR frequency band+an LTE frequency band, (3) an NR frequency band+a 3G frequency band, and (4) an NR frequency band+a 2G frequency band, as shown by frequency band combinations corresponding to an index 1 to an index 5 in Table 1.

For example, description is provided by using an example in which the frequency band combination of the two cards is an NR frequency band+an LTE frequency band. A primary card is registered with the SA network, and a corresponding frequency band is NR N28. A secondary card is registered with an LTE network, and a corresponding frequency band is LTE B40. Correspondingly, the frequency band combination of the two cards is NR N28+LTE B40. If it is detected, by performing a performance test, that when the frequency band combination of NR N28+LTE B40 is used, signal strength of the terminal device (for example, the secondary card) is less than a preset threshold, in other words, the frequency band combination has poor compatibility performance, the frequency band combination of NR N28+LTE B40 may be added to the blacklist, as shown by an index 3 in Table 1.

For another example, description is provided by using an example in which the frequency band combination of the two cards is an NR frequency band+an NR frequency band. A primary card is registered with the SA network, and a corresponding frequency band is NR N78. A secondary card is registered with the SA network, and a corresponding frequency band is NR N3. Correspondingly, the frequency band combination of the two cards is NR N78+NR N3. If it is detected, by performing a performance test, that when the frequency band combination of NR N78+NR B3 is used, signal strength of the terminal device (for example, the secondary card) is less than a preset threshold, in other words, the frequency band combination has poor compatibility performance, the frequency band combination of NR N78+NR N3 may be added to the blacklist, as shown by the index 5 in Table 1.

In some other embodiments, for a scenario in which a SIM card 1 is registered with a 5G NSA network and a SIM card 2 is registered with a 5G NSA/4G/3G/2G network, a frequency band combination of the two cards may be (1) an ENDC frequency band combination+an ENDC frequency band combination, (2) an ENDC frequency band combination+an LTE frequency band, (3) an ENDC frequency band combination+a 3G frequency band, and (4) an ENDC frequency band combination+a 2G frequency band. In this case, the frequency band combination of the two cards may include three frequency bands or at least three frequency bands.

For example, description is provided by using an example in which the frequency band combination of the two cards is an ENDC frequency band combination+an LTE frequency band. A primary card is registered with the 5G NSA network, an ENDC link is added, and the ENDC frequency band combination is (LTE B3+NR N41). A secondary card is registered with an LTE network, and a corresponding frequency band is LTE B5. Correspondingly, the frequency band combination of the two cards is (LTE B3+NR N41)+LTE B5. If it is detected, by performing a test, that when the frequency band combination of (LTE B3+NR N41)+LTE B5 is used, signal strength of the terminal device (for example, the secondary card) is less than a preset threshold, in other words, the frequency band combination has poor compatibility performance, the frequency band combination of (LTE B3+NR N41)+LTE B5 may be added to the blacklist, as shown by an index 6 in Table 1.

(2) When it is Detected that the Frequency Band Combination of the Two Cards is in the Blacklist, Fallback of an NR Capability is Triggered.

For a dual-card user scenario that supports the 5G SA mode or the 5G NSA mode, it may be determined in real time whether the frequency band combination of the two cards is in the blacklist and whether signal quality of the secondary card is relatively poor. If the frequency band combination of the two cards is in the blacklist and the signal quality of the secondary card is less than the preset threshold, fallback of the NR capability is performed based on a 5G network mode (SA or NSA) by using a corresponding method.

In some embodiments, when the frequency band combination of the two cards falls within the blacklist, it may be determined, based on a signal status, whether fallback of the NR capability is required. For example, after the frequency band combination of the two cards falls within the blacklist, if it is found that the signal quality of the secondary card is relatively poor, fallback of the NR capability is performed, for example, an NR frequency band is forbidden or the NR capability is directly disabled.

In some other embodiments, when it is detected that signal quality of the primary card or the secondary card in the terminal device is relatively poor, it may be further detected whether the frequency band combination of the two cards falls within the blacklist, and when the frequency band combination of the two cards falls within the blacklist, the NR capability is controlled to fall back, for example, an NR frequency band is forbidden or the NR capability is directly disabled.

In actual implementation, there may be the following specific implementations in which the NR capability is controlled to fall back:

(a) When the terminal device (the primary card and/or the secondary card) accesses the 5G NSA network, an ENDC link may be correspondingly removed, the NR frequency band is forbidden, and addition of ENDC is suppressed. For example, for a scenario in which the primary card is registered with the 5G NSA network, and the secondary card is registered with 5G NSA/4G/3G/2G, if there is an ENDC link for the primary card and/or an ENDC link for the secondary card, the ENDC link of the primary card and/or the ENDC link of the secondary card are/is removed, and addition of ENDC is suppressed.

(b) When the terminal device (the primary card and/or the secondary card) accesses the 5G SA network, an SA capability may be correspondingly disabled and the terminal device falls back from the 5G network to a 4G/3G/2G network. For example, for a scenario in which the primary card is registered with the 5G SA network, and the secondary card is registered with 5G SA/4G/3G/2G, an SA capability of the primary card and/or an SA capability of the secondary card are/is disabled.

After fallback of the NR capability is triggered, due to mobility of the terminal device, the frequency band combination of the two cards changes. For example, a frequency band of the primary card changes, a frequency band of the secondary card changes, or frequency bands of both the primary card and the secondary card change. Further, it is determined whether a changed frequency band combination of the two cards is still in the blacklist.

In the solutions of this application, it may be determined, by using the blacklist, whether an operating frequency band currently used by the dual-card terminal device is a problem frequency band combination. When the dual-card terminal device works on the problem frequency band combination and signal quality of the dual-card terminal device does not meet a condition, a corresponding policy may be executed, that is, the dual-card terminal device is suppressed from working on the 5G NR frequency band, to alleviate a case in which the signal quality deteriorates because the dual-card terminal device works on the problem frequency band combination.

(3) When it is Detected that the Frequency Band Combination of the Two Cards is not in the Blacklist, Stop of Fallback of the NR Capability is Triggered, to Restore the NR Capability.

When it is detected that the changed frequency band combination of the two cards is not in the blacklist, the NR capability is restored based on the 5G network mode (SA or NSA) by using a corresponding method.

In the NSA mode, if addition of the ENDC link is suppressed, suppression is stopped, in other words, addition of the ENDC link is allowed.

In the SA mode, if the SA capability is disabled, disabling is stopped, in other words, the SA capability is re-enabled.

It should be noted that a whitelist may further be established in the embodiments of this application, and a frequency band combination in the whitelist may be a frequency band combination with relatively high frequency band compatibility. Specifically, after the terminal device is suppressed from working on the 5G NR frequency band, if the frequency band combination of the two cards is a frequency band combination in the whitelist, the NR capability of the terminal device may be restored.

The solutions provided in the embodiments of this application in the NSA mode and the SA mode are separately described below by using examples and with reference to (2) and (3).

For example, if the 5G network mode is NSA, and the signal quality of the secondary card is less than the preset threshold, the terminal device may initiate an SCG failure (SCG failure) procedure, trigger the network to release the ENDC link, that is, to break an NR link in the ENDC link, and suppress subsequent addition of a new ENDC link. When the frequency band combination of the two cards changes and the changed frequency band combination is not in the blacklist, suppression is stopped, and subsequently, a new ENDC link may be added through network configuration.

That the terminal device initiates an SCG failure may include: The terminal device exchanges signaling with the 5G NSA network, and performs radio resource control (radio resource control, RRC) reconfiguration, and the terminal device sends SCG failure information to the 5G NSA network, and then the 5G NSA network delivers SCG release (SCG release) information to the terminal device, to release the ENDC link, that is, to break the NR link in the ENDC link.

For another example, if the 5G network mode is SA, and the signal quality of the secondary card is less than the preset threshold, the terminal device may actively disable the SA capability, and then trigger a search for a network in a lower-standard network. An example in which an LTE network is searched for is used. When initiating a TAU procedure in the LTE network, the terminal device notifies the LTE network that the terminal device does not support the SA capability. Further, if the frequency band combination of the two cards changes and the changed frequency band combination is not in the blacklist, the terminal device may re-enable the SA capability, notify, by using the TAU procedure, the LTE network that the SA capability is restored, and then be registered with the SA network through network configuration update.

In actual implementation, the preset threshold of the signal quality of the secondary card may be preset by a system, and is stored in the terminal device as a factory settings parameter. Optionally, different preset thresholds may be used for different network standards. This may be specifically determined based on an actual use requirement, and is not limited in the embodiments of this application. For example, for an NR network standard or an LTE network standard, the threshold may be preset to −100 decibels (dB). For a 2G or 3G network standard, the threshold may be preset to −80 dB.

It should be noted that the solutions in this application are also applicable to another performance problem that is of a frequency band combination of two cards and that is caused due to various reasons, for example, a problem that performance of the frequency band combination of the two cards may deteriorate due to a network limitation of a specific frequency band. For such a scenario, the method in this application may also be used to determine whether a frequency band combination of two cards is in a blacklist and whether signal quality of a secondary card is less than a preset threshold. If the frequency band combination of the two cards is in the blacklist and the signal quality of the secondary card is less than the preset threshold, an NR capability is controlled to fall back, to improve the signal quality of the secondary card. Further, when the frequency band combination of the two cards changes and a changed frequency band combination of the two cards is not in the blacklist, the NR capability may be controlled to be restored, to ensure signal quality of the two cards, so as to avoid a problem that basic experience of a user is affected due to a problem frequency band combination.

Figure 2A:
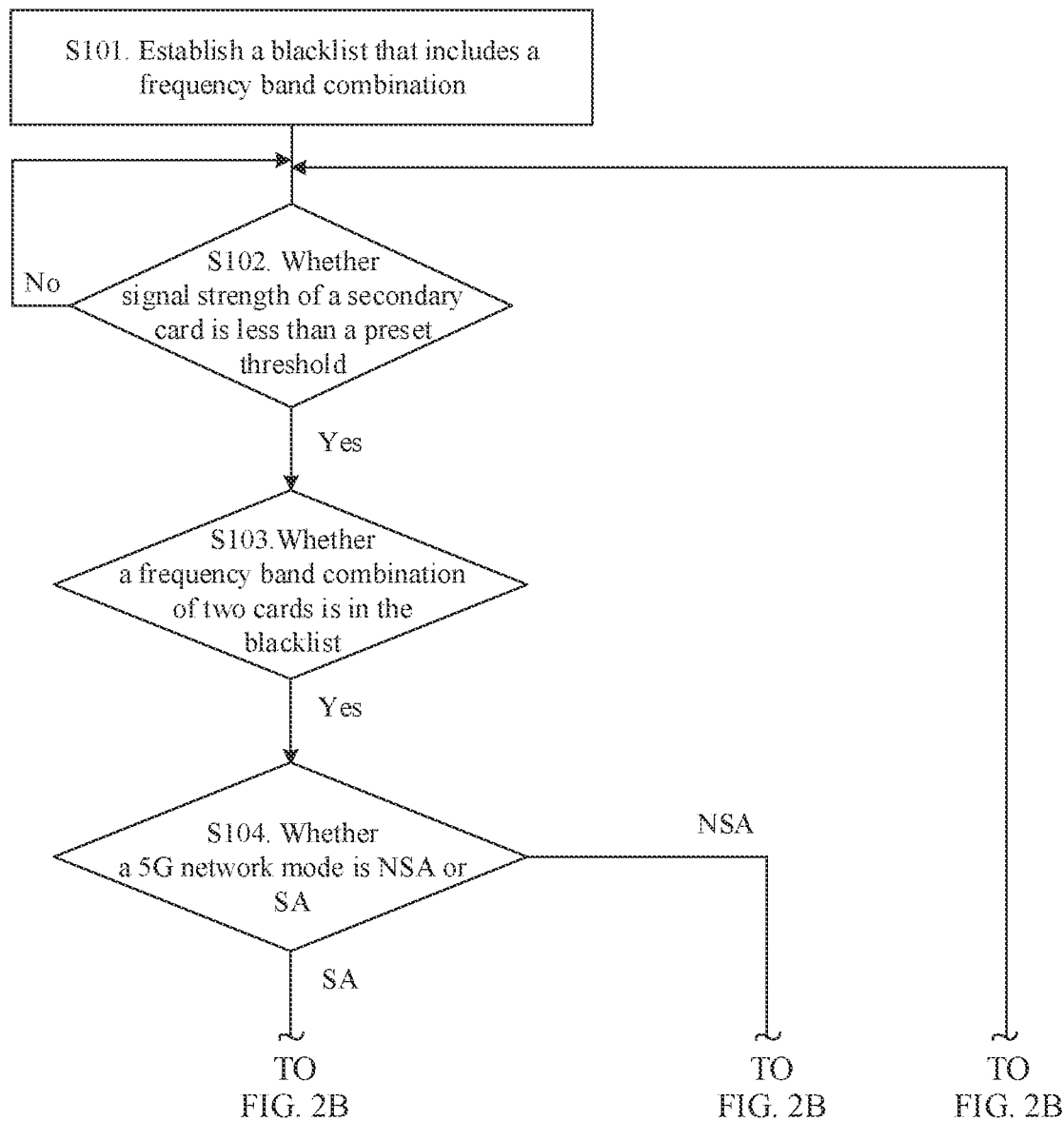
FIG. 2A and FIG. 2B are a schematic flowchart of a frequency band control method in an abnormal scenario of a dual-card terminal according to an embodiment of this application.
Figure 2B:
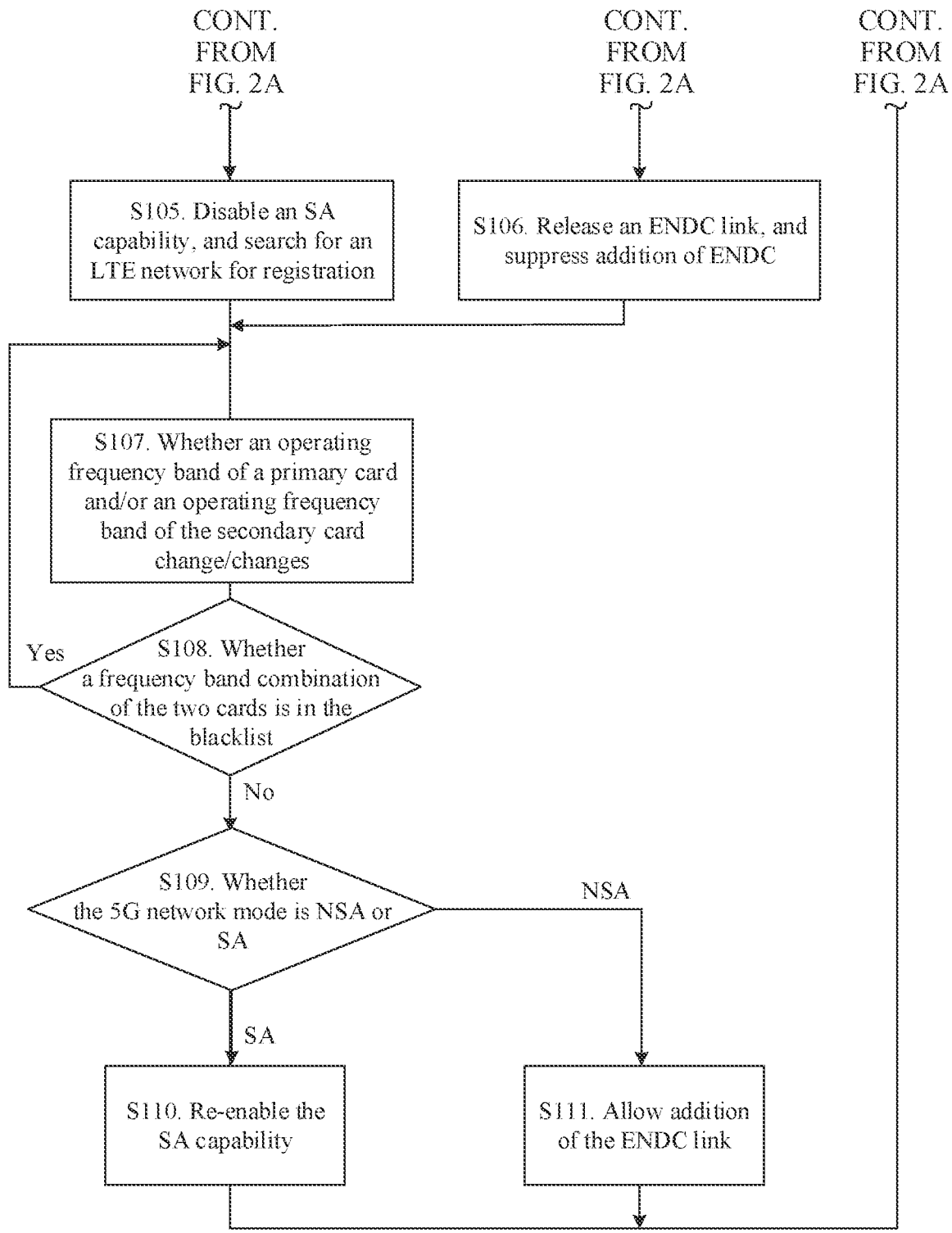

A frequency band control method in an abnormal scenario of a dual-card terminal according to an embodiment of this application is described below by using an example and with reference to FIG. 2A and FIG. 2B. As shown in FIG. 2A and FIG. 2B, the method includes the following steps S101 to S111.

S101. Establish a blacklist that includes a frequency band combination.

As described above, if it is detected that when two or more frequency bands are used in combination, communication performance of a device deteriorates, this type of frequency band combination is added to the blacklist.

S102. Determine whether signal strength of a secondary card is less than a preset threshold.

If the signal strength of the secondary card is less than the preset threshold, a terminal device continues to perform the following step S103. If the signal strength of the secondary card is greater than or equal to the preset threshold, the terminal device returns to continue to perform S102.

S103. Determine whether a frequency band combination of two cards is in the blacklist.

If the frequency band combination of the two cards is in the blacklist, the terminal device continues to perform the following step S104. If the frequency band combination of the two cards is not in the blacklist, the method ends.

It should be noted that an order of performing S102 and S103 is not limited in this embodiment of this application. For example, the terminal device may first determine whether the frequency band combination of the two cards is in the blacklist, and then determine whether the signal strength of the secondary card is less than the preset threshold after determining that the frequency band combination of the two cards is in the blacklist. Alternatively, the terminal device may simultaneously determine whether the frequency band combination of the two cards is in the blacklist and whether the signal strength of the secondary card is less than the preset threshold. This may be specifically determined based on an actual use requirement, and is not limited in this embodiment of this application. For ease of description, in this embodiment of this application, description is provided by using an example in which it is first determined whether the signal strength of the secondary card is less than the preset threshold, and then it is determined whether the frequency band combination of the two cards is in the blacklist.

Based on S102 and S103, when determining that the frequency band combination of the two cards is in the blacklist and that the signal strength of the secondary card is less than the preset threshold, the terminal device continues to perform the following step S104.

S104. Determine whether a 5G network mode is an NSA mode or an SA mode.

In some embodiments, the terminal device may report network capability information to a network (for example, an MME) by using a procedure of attachment (attach) to the network or a TAU procedure. An information element (information element, IE) in the network capability information may include a bit "N1 mode". When the bit "N1 mode" is set to a first value (for example, 0), the network capability information is used to indicate that the terminal device does not support 5G or the SA networking mode, which is equivalent to that the terminal device disables a capability of supporting NR by the terminal device (disable NR). When the bit "N1 mode" is set to a second value (for example, 1), the network capability information is used to indicate that the terminal device supports 5G and the SA networking mode. In this way, the network may learn whether the 5G network mode is the NSA mode or the SA mode.

S105. If the 5G network mode of the terminal capability is the SA mode, disable an SA capability, and search for a lower-standard network (for example, an LTE network) for registration.

Optionally, there may be the following two manners in which the terminal device falls back from a 5G SA network to the LTE network:

(1) When the SA Capability is Disabled, the Terminal Device May be Independently Connected to a 4G Base Station and Registered with an EPC.

Specifically, the terminal device may be first disconnected from the 5G SA network, and then independently connected to the LTE network. Specifically, the terminal device may independently search, on an LTE frequency band, for a cell served by the 4G base station, and select a cell to camp on. After camping on the cell served by the 4G base station, the terminal device performs an RRC connection establishment (RRC connection establishment) procedure and a random access procedure (random access procedure) with the cell, to establish a connection to the cell, in other words, to be connected to the 4G base station. After being connected to the 4G base station, the terminal device may be registered with the EPC, to use a service provided by the EPC.

In other words, in the manner (1), the terminal device independently falls back from the 5G SA network to the LTE network.

(2) When the SA Capability is Disabled, the Terminal Device May Fall Back to the LTE Network Under Trigger of a 5G Base Station.

Specifically, when the SA capability is disabled, the terminal device may report an LTE-related B1 event and/or B2 event to the 5G base station based on a private threshold. The 5G base station responds to the LTE-related B1 event and/or B2 event, and the terminal device falls back to the LTE network under trigger of the 5G base station.

The LTE-related B1 event and B2 event are events used to initiate a handover to a different system. Herein, the different system is an LTE system. When quality of a neighboring cell in the LTE network is greater than an absolute threshold 1, the terminal device reports the LTE-related B1 event. When quality of a serving cell served by the currently connected 5G base station is less than an absolute threshold 2, and the quality of the neighboring cell in the LTE network is greater than an absolute threshold 3, the terminal device reports the LTE-related B2 event. That is, after the terminal device reports the LTE-related B1 event or B2 event to a 5GC, the 5GC triggers the terminal device to be handed over from the 5G SA network to the LTE network.

In this embodiment of this application, the terminal device may set the private threshold, and the private threshold may be set as follows: The SA capability of the terminal device is disabled. That is, provided that the SA capability of the terminal device is disabled, the terminal device reports the LTE-related B1 event and/or B2 event to the 5G base station, so that the 5G base station initiates the handover to a different system, and triggers the terminal device to fall back from the 5G SA network to the LTE network.

In this embodiment of this application, the 5G base station may trigger, based on a terminal capability and a network deployment status, the terminal device to fall back from the 5G SA network to the LTE network through handover (handover to LTE) or redirection (redirect to LTE). A specific manner used by the terminal device to fall back to the LTE network is determined based on the 5G SA network.

When the handover manner (handover to LTE) is used, the terminal device is disconnected from the 5G SA network after being connected to the LTE network. In this manner, no air interface connection is released, and there is relatively high efficiency. When the redirection manner (redirect to LTE) is used, the terminal device is first disconnected from the 5G SA network, and then is connected to the LTE network. In this manner, an air interface connection is released, and subsequently a new air interface connection needs to be established.

When the SA capability is disabled, the terminal device may set the bit "N1 mode" in the network capability information to the first value (for example, 0). The network capability information is used to indicate that the terminal device does not support 5G or the SA networking mode, to avoid a case in which the terminal device is handed over from the LTE network to the 5G SA network again under trigger of the EPC after falling back from the 5G SA network to the LTE network when the SA capability is disabled.

S106. If the 5G network mode of the terminal capability is the NSA mode, release an ENDC link, and suppress addition of the ENDC link.

S107. An operating frequency band of a primary card and/or an operating frequency band of the secondary card in the terminal device change/changes.

Specifically, whether the operating frequency band of the primary card changes, the operating frequency band of the secondary card changes, or the operating frequency bands of both the primary card and the secondary card change is related to actions performed in S105 and S106. For details, refer to the following detailed description.

S108. Determine whether a frequency band combination of the two cards is still in the blacklist.

If the frequency band combination of the two cards is not in the blacklist, the terminal device continues to perform the following step S109. If the frequency band combination of the two cards is still in the blacklist, the terminal device returns to continue to perform S107.

S109. Determine whether the 5G network mode is the NSA mode or the SA mode.

S110. If the 5G network mode is the SA mode, re-enable the SA capability.

Herein, the terminal device may set the bit "N1 mode" in the network capability information to the second value (for example, 1). The network capability information is used to indicate that the terminal device supports 5G and the SA networking mode.

When the changed frequency band combination of the two cards is not in the blacklist, the SA capability is re-enabled to restore an NR capability.

S111. If the 5G network mode is the NSA mode, allow addition of the ENDC link.

When the changed frequency band combination of the two cards is not in the blacklist, suppression of addition of the ENDC link is stopped, to restore the NR capability.

After S110 or S111, steps S102 to S109 may continue to be cyclically performed.

The technical solutions of this application and how the technical solutions of this application resolve the foregoing technical problem are described below in detail by using specific embodiments. The following several specific embodiments may be combined with each other. A same or similar concept or process may not be described in some embodiments.

It should be noted that in the embodiments of this application, no particular limitation is constituted on a specific structure of a body of performing the method provided in the embodiments of this application, provided that communication can be performed by running a program in which code of the method provided in the embodiments of this application is recorded and according to the method provided in the embodiments of this application. For example, the method provided in the embodiments of this application may be performed by a terminal device or a network device (for example, the foregoing 4G base station and/or EPC or the foregoing 5G base station and/or 5GC) or a functional module, in a terminal device or a network device, that can invoke and execute a program.

TABLE 2

| | Dual-card terminal device | |
|---|---|---|
| 5G network mode | Primary card | Secondary card |
| NSA mode | 5G NSA network | 4G/3G/2G network |
| | 4G/3G/2G network | 5G NSA network |
| | 5G NSA network | 5G NSA network |
| SA mode | 5G SA network | 4G/3G/2G network |
| | 4G/3G/2G network | 5G SA network |
| | 5G SA network | 5G SA network |

Table 2 shows possible combinations of networks on which the primary card and the secondary card in the dual-card terminal device respectively camp. Referring to Table 2, the primary card and the secondary card may camp on a same network or different networks. A specific implementation of the frequency band control method in an abnormal scenario of a dual-card terminal provided in the embodiments of this application varies with a case. The embodiments of this application include but are not limited to the scenarios listed in Table 2. For a scenario in which the 5G network mode is the NSA mode, specific implementations of the frequency band control method in an abnormal scenario of a dual-card terminal provided in the embodiments of this application are described below in detail by using Embodiment 1, Embodiment 2, and Embodiment 3 and with reference to FIG. 3A, FIG. 3B, FIG. 4A, FIG. 4B, FIG. 5A, FIG. 5B, and FIG. 5C.

Embodiment 1

Figure 3A:
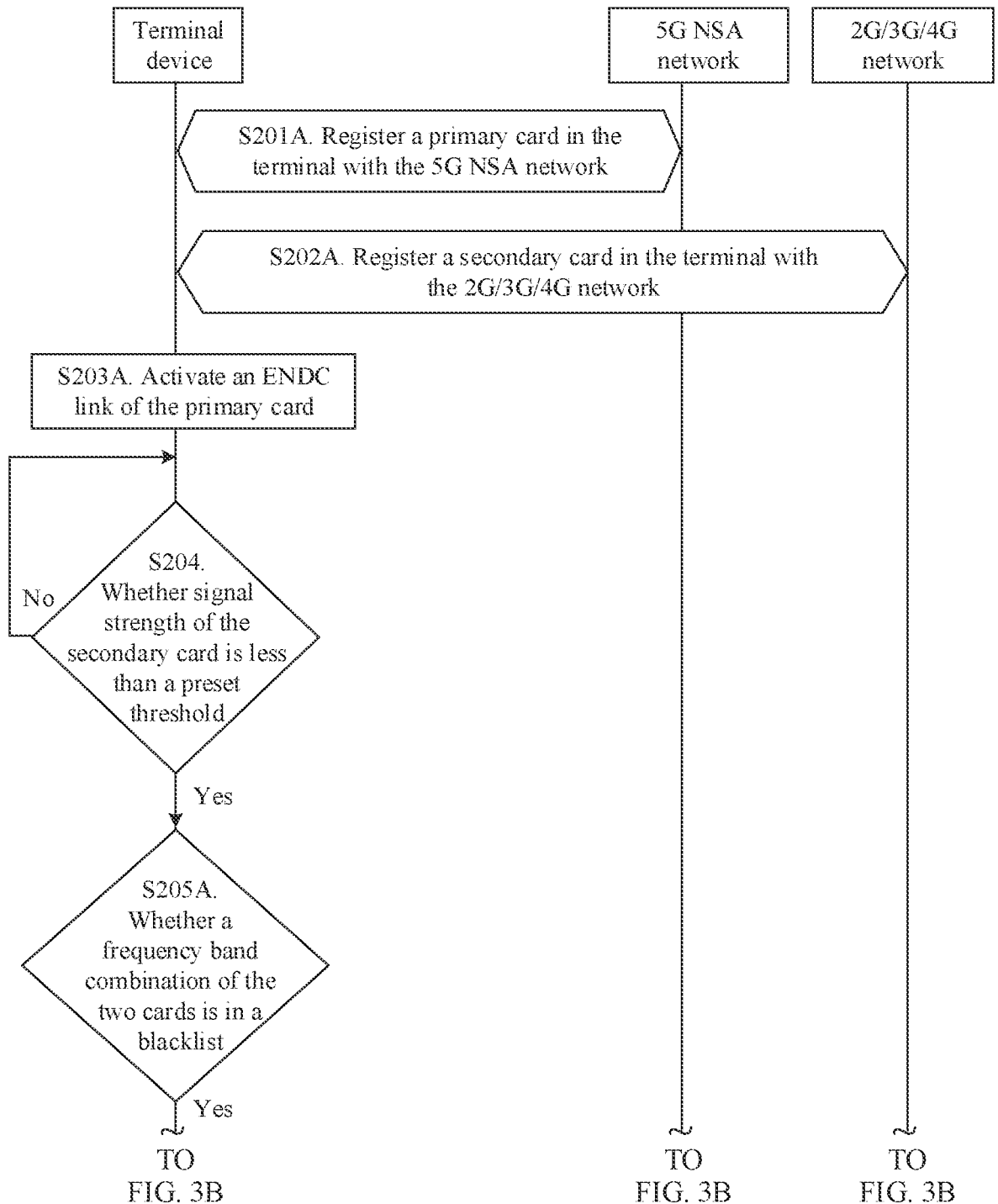
FIG. 3A and FIG. 3B are a first schematic flowchart of a frequency band control method in an abnormal scenario of a dual-card terminal in a scenario in which a terminal device is registered with an NSA network according to an embodiment of this application.
Figure 3B:
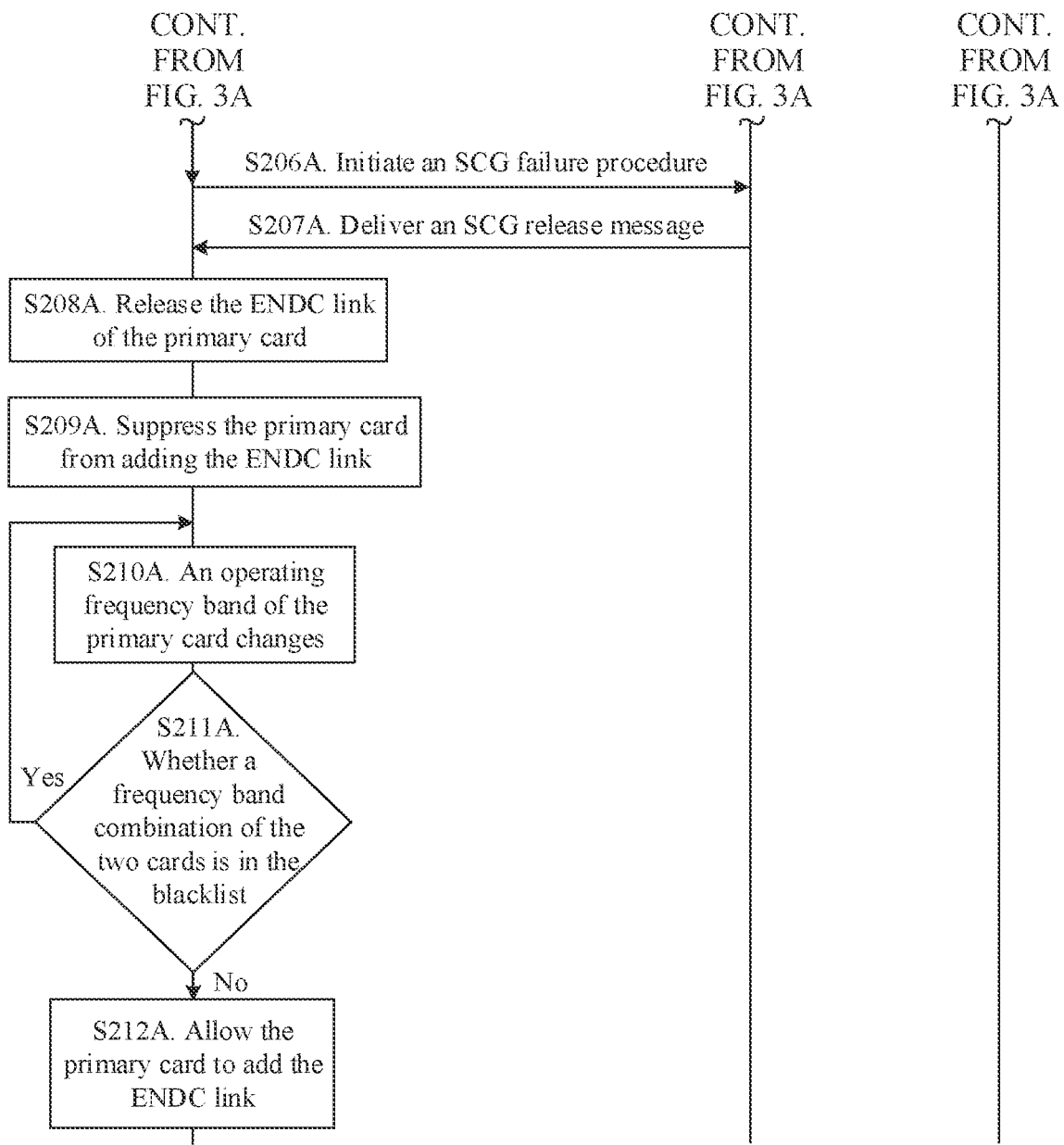

FIG. 3A and FIG. 3B are a signaling flowchart of a frequency band control method in an abnormal scenario of a dual-card terminal according to this embodiment of this application for a scenario in which a primary card camps on a 5G NSA network and a secondary card camps on a 2G/3G/4G network. The method specifically includes the following steps S201A to S212A.

S201A. Register the primary card in a terminal device with the 5G NSA network.

In a process of connecting the primary card to the 5G NSA network, the terminal device is first connected to a 4G base station, and then is attached to and registered with an EPC.

S202A. Register the secondary card in the terminal device with the 2G/3G/4G network.

When the secondary card is registered with the 2G network, an operating frequency band of the secondary card is a 2G frequency band. When the secondary card is registered with the 3G network, an operating frequency band of the secondary card is a 3G frequency band. When the secondary card is registered with the 4G network, an operating frequency band of the secondary card is a 4G frequency band.

An example in which the secondary card is registered with the 4G network is used. The secondary card is first connected to the 4G base station, and then is attached to and registered with the EPC.

S203A. The terminal device activates an ENDC link of the primary card.

When the primary card is connected to the 5G NSA network and the ENDC link is activated, the primary card may establish dual connectivity with the 4G base station and a 5G base station. In this case, an operating frequency band of the primary card includes a 5G frequency band and a 4G frequency band.

S204A. The terminal device determines whether signal strength of the secondary card is less than a preset threshold.

When the signal strength of the secondary card is less than the preset threshold, the dual-card terminal device is in an abnormal scenario.

S205A. The terminal device determines whether a frequency band combination of the two cards is in a blacklist.

Based on S204A and S205A, when determining that the frequency band combination of the two cards is in the blacklist and the signal strength of the secondary card is less than the preset threshold, the terminal device continues to perform the following step S206A.

It is assumed that the operating frequency band of the primary card is LTE B3+NR N41, and the operating frequency band of the secondary card is LTE B5. It may be learned, with reference to Table 1, that the blacklist includes (LTE B3+NR N41)+LTE B5. Therefore, the terminal device may determine that the frequency band combination of the two cards is in the blacklist.

S206A. The terminal device initiates an SCG failure (SCG failure) procedure to the NSA network.

S207A. The terminal device receives an SCG release (SCG release) message delivered by the NSA network.

S208A. The terminal device releases the ENDC link of the primary card.

The terminal device releases an NR link in the ENDC link of the primary card.

S209A. The terminal device suppresses the primary card from adding the ENDC link.

Specifically, when the frequency band combination including the 5G frequency band and the 4G frequency band of the primary card and the 2G/3G/4G frequency band of the secondary card is in the blacklist, and signal quality of the secondary card is less than the preset threshold, the terminal device initiates the SCG failure procedure, triggers the network to release the NR link in the ENDC link, and suppresses addition of the ENDC link.

S210A. The operating frequency band of the primary card changes.

When the established ENDC link of the primary card is released, the operating frequency band of the primary card changes. The 5G frequency band is disabled, and the 4G frequency band is reserved for continued use. In this way, the frequency band combination including the 5G frequency band and the 4G frequency band of the primary card and the 2G/3G/4G frequency band of the secondary card changes to a frequency band combination including the 4G frequency band of the primary card and the 2G/3G/4G frequency band of the secondary card.

For example, if the operating frequency band of the primary card is LTE B3+NR N41, after the NR link in the ENDC link of the primary card is released, the operating frequency band of the primary card changes to LTE B3. In this case, the frequency band combination of the two cards changes from (LTE B3+NR N41)+LTE B5 to (LTE B3+LTE B5).

S211A. The terminal device determines whether the frequency band combination of the two cards is still in the blacklist.

If the changed frequency band combination of the two cards (the 4G frequency band of the primary card+the 2G/3G/4G frequency band of the secondary card) is not in the blacklist, the terminal device continues to perform the following step S212A. If the changed frequency band combination of the two cards is still in the blacklist, the terminal device returns to continue to perform S210A.

For example, it may be learned, with reference to Table 1, that the blacklist does not include (LTE B3+LTE B5). Therefore, the current frequency band combination of the two cards is not in the blacklist, and the foregoing frequency band control policy is executed, to correspondingly improve the signal quality of the secondary card in the terminal device. In this way, a case in which signal quality deteriorates because the dual-card terminal device works on a problem frequency band combination can be alleviated.

S212A. The terminal device allows the primary card to add the ENDC link.

Specifically, when the changed frequency band combination (the 4G frequency band of the primary card+the 2G/3G/4G frequency band of the secondary card) is not in the blacklist, the terminal device triggers to stop suppression of addition of the ENDC link. Therefore, the primary card is allowed to establish a new ENDC link and continue to use the 5G frequency band, to restore an NR capability.

In the solution provided in Embodiment 1, in the scenario in which the primary card in the terminal device is registered with the 5G NSA network and the secondary card is registered with the 2G/3G/4G network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the ENDC link of the primary card is released, and the primary card is suppressed from adding the ENDC link, to improve the signal quality of the secondary card. Further, when the frequency band combination of the two cards changes and the changed frequency band combination of the two cards is not in the blacklist, suppression of addition of the ENDC link may be stopped to restore the NR capability, to ensure signal quality of the two cards, so as to avoid a problem that basic experience of a user is affected due to a problem frequency band combination.

Embodiment 2

Figure 4A:
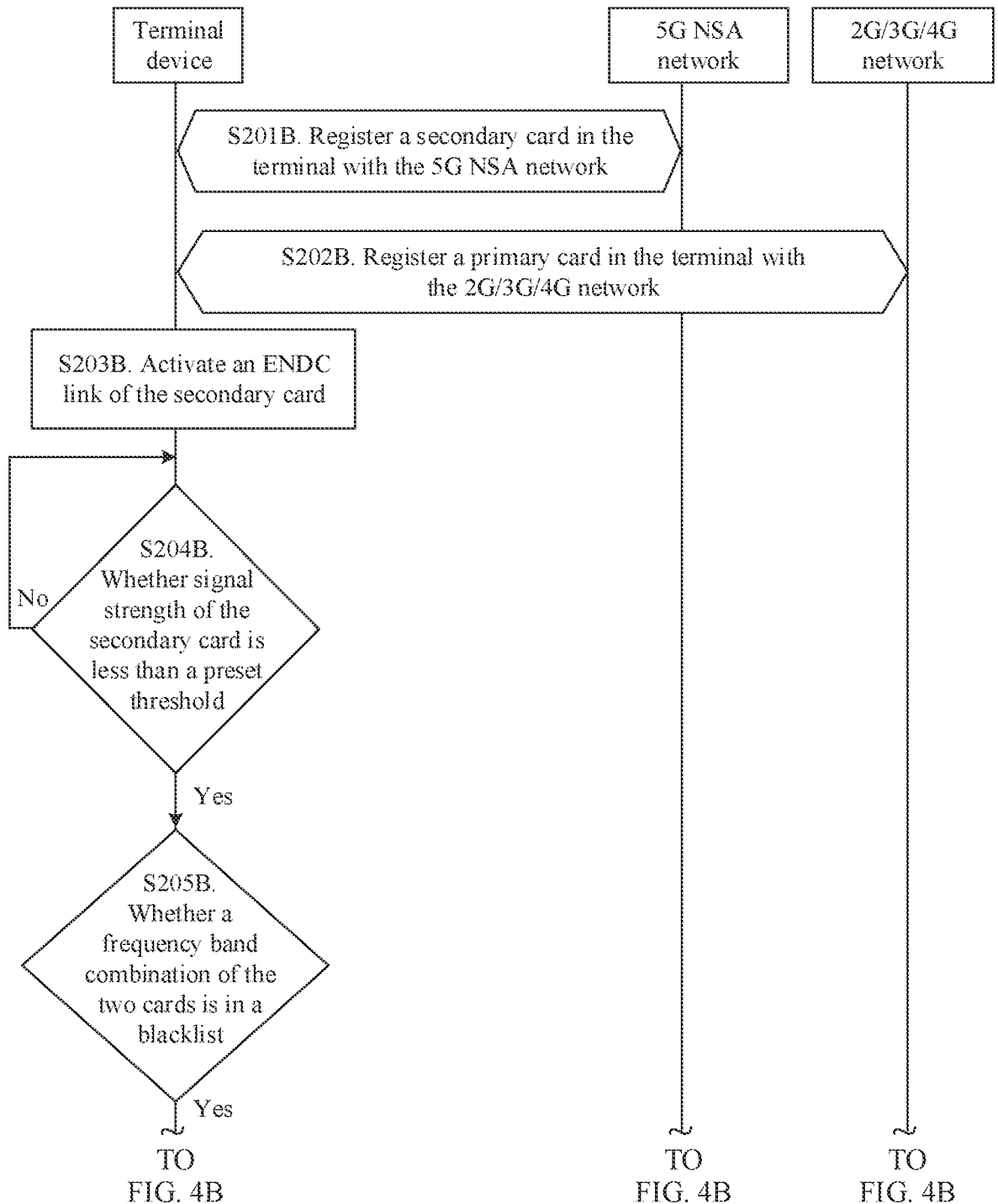
FIG. 4A and FIG. 4B are a second schematic flowchart of a frequency band control method in an abnormal scenario of a dual-card terminal in a scenario in which a terminal device is registered with an NSA network according to an embodiment of this application.
Figure 4B:
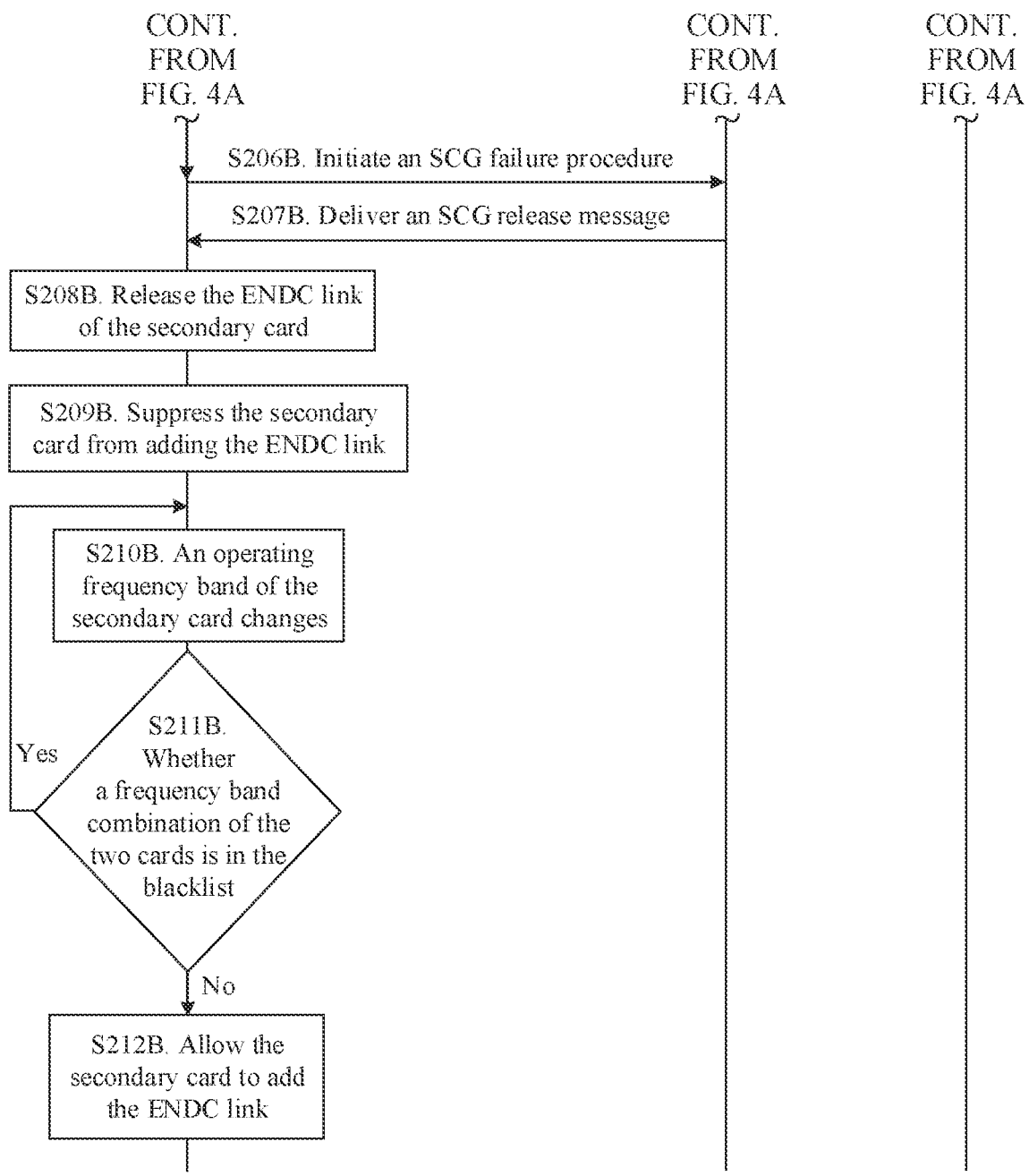

FIG. 4A and FIG. 4B are a signaling flowchart of a frequency band control method in an abnormal scenario of a dual-card terminal according to this embodiment of this application for a scenario in which a secondary card camps on a 5G NSA network and a primary card camps on a 2G/3G/4G network. The method specifically includes the following steps S201B to S212B.

S201B. Register the secondary card in a terminal device with the 5G NSA network.

S202B. Register the primary card in the terminal device with the 2G/3G/4G network.

S203B. The terminal device activates an ENDC link of the secondary card.

When the secondary card is connected to the 5G NSA network and the ENDC link is activated, the secondary card may establish dual connectivity with NR and LTE. In this case, an operating frequency band of the secondary card includes a 5G frequency band and a 4G frequency band.

S204B. The terminal device determines whether signal strength of the secondary card is less than a preset threshold.

S205B. The terminal device determines whether a frequency band combination of the two cards is in a blacklist.

Based on S204B and S205B, when determining that the frequency band combination of the two cards is in the blacklist and the signal strength of the secondary card is less than the preset threshold, the terminal device continues to perform the following step S206B.

S206B. The terminal device initiates an SCG failure (SCG failure) procedure to the NSA network.

S207B. The terminal device receives an SCG release (SCG release) message delivered by the NSA network.

S208B. The terminal device releases the ENDC link of the secondary card.

S209B. The terminal device suppresses the secondary card from adding the ENDC link.

When the frequency band combination including a 2G/3G/4G frequency band of the primary card and the 5G frequency band and the 4G frequency band of the secondary card is in the blacklist, and signal quality of the secondary card is less than the preset threshold, the terminal device initiates the SCG failure procedure to the NSA network, triggers the NSA network to release the ENDC link, and suppresses addition of the ENDC link.

S210B. The operating frequency band of the secondary card changes.

Specifically, when the established ENDC link of the secondary card is released, the operating frequency band of the secondary card changes. The 5G NR frequency band is disabled, and the 4G frequency band is reserved for continued use. In this way, the frequency band combination including the 2G/3G/4G frequency band of the primary card and the 5G frequency band and the 4G frequency band of the secondary card changes to a frequency band combination including the 2G/3G/4G frequency band of the primary card and the 4G frequency band of the secondary card.

S211B. The terminal device determines whether the frequency band combination of the two cards is still in the blacklist.

If the changed frequency band combination of the two cards (the 2G/3G/4G frequency band of the primary card+ the 4G frequency band of the secondary card) is not in the blacklist, the terminal device continues to perform the following step S212B. If the changed frequency band combination of the two cards is still in the blacklist, the terminal device returns to continue to perform S210B.

S212B. The terminal device allows the secondary card to add the ENDC link.

Specifically, when the changed frequency band combination (the 2G/3G/4G frequency band of the primary card+the 4G frequency band of the secondary card) is not in the blacklist, the terminal device triggers to stop suppression of addition of the ENDC link. Therefore, the secondary card is allowed to establish a new ENDC link and continue to use the 5G frequency band, to restore an NR capability.

For implementation processes of S201B to S212B in Embodiment 2, refer to detailed description of S201A to S212A in Embodiment 1. Details are not described herein.

In the solution provided in Embodiment 2, in the scenario in which the secondary card in the terminal device is registered with the 5G NSA network and the primary card is registered with the 2G/3G/4G network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the ENDC link of the secondary card is released, and the secondary card is suppressed from adding the ENDC link, to improve the signal quality of the secondary card. Further, when the frequency band combination of the two cards changes and the changed frequency band combination of the two cards is not in the blacklist, suppression of addition of the ENDC link may be stopped to restore the NR capability, to ensure signal quality of the two cards, so as to avoid a problem that basic experience of a user is affected due to a problem frequency band combination.

Embodiment 3

Figure 5A:
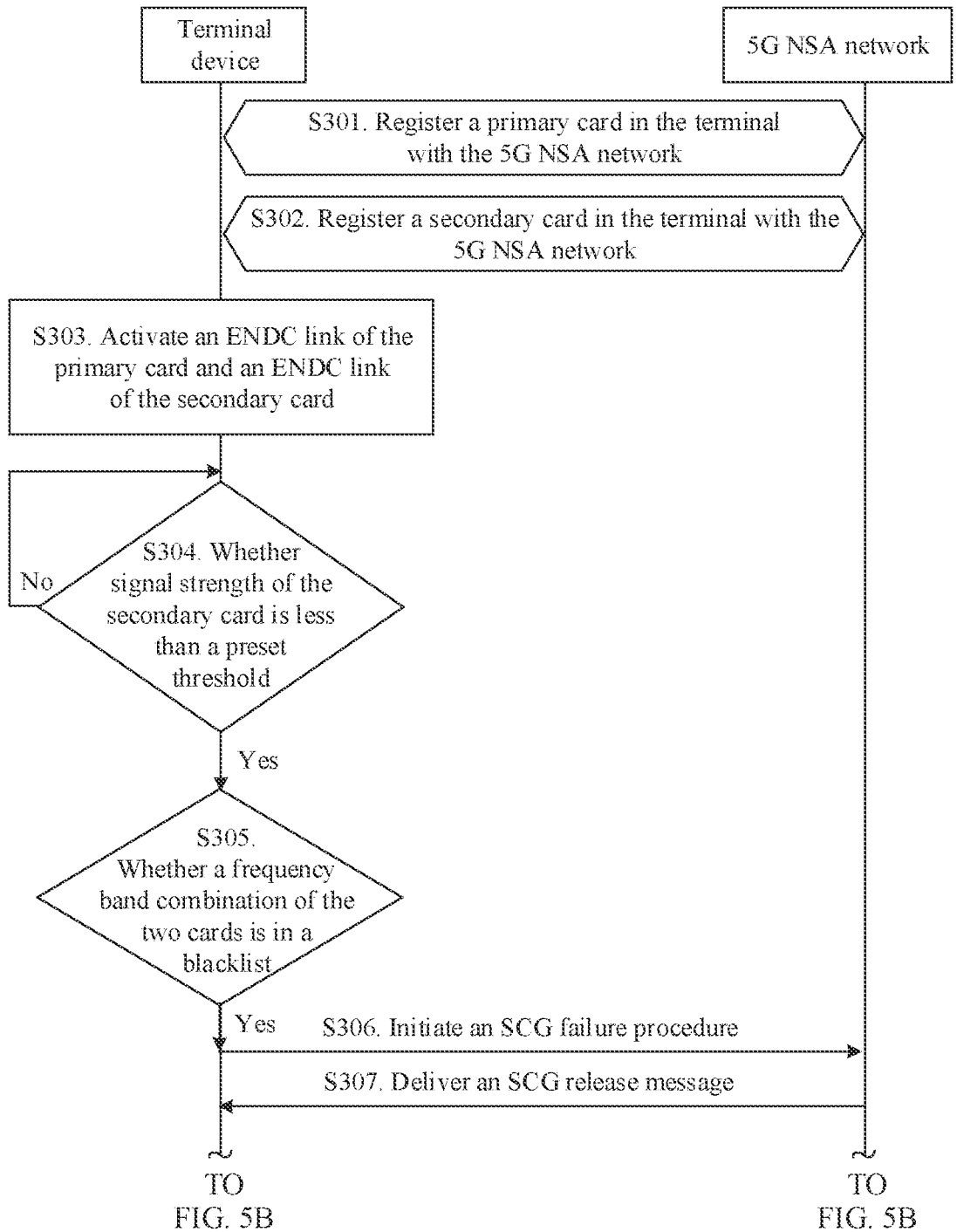
FIG. 5A, FIG. 5B, and FIG. 5C are a third schematic flowchart of a frequency band control method in an abnormal scenario of a dual-card terminal in a scenario in which a terminal device is registered with an NSA network according to an embodiment of this application.
Figure 5B:
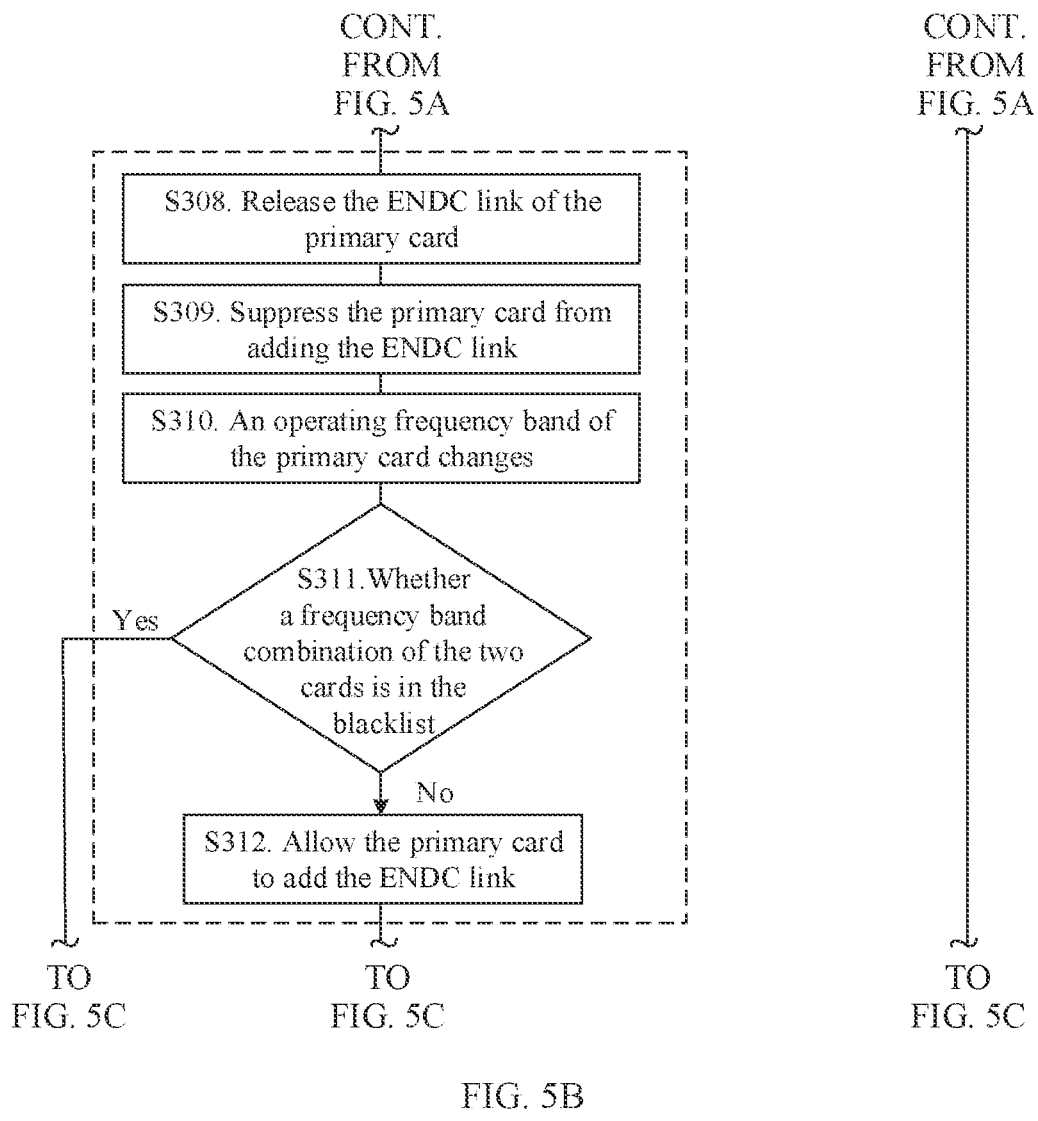
Figure 5C:
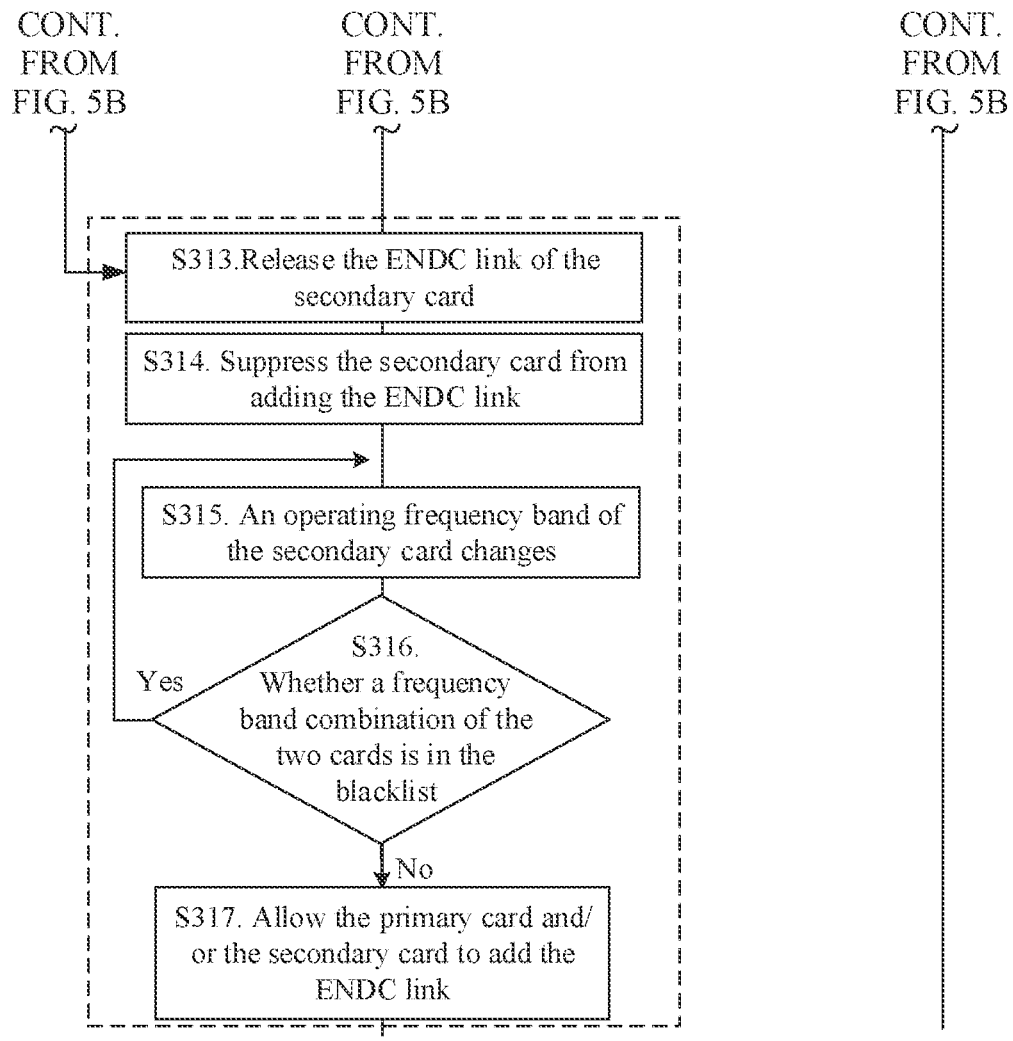

FIG. 5A, FIG. 5B, and FIG. 5C are a signaling flowchart of a frequency band control method in an abnormal scenario of a dual-card terminal according to this embodiment of this application for a scenario in which both a primary card and a secondary card camp on a 5G NSA network. The method specifically includes the following steps S301 to S317.

S301. Register the primary card in a terminal device with the 5G NSA network.

S302. Register the secondary card in the terminal device with the 5G NSA network.

S303. The terminal device activates an ENDC link of the primary card and an ENDC link of the secondary card.

When the primary card is connected to the 5G NSA network and the ENDC link is activated, the primary card may establish dual connectivity with NR and LTE. Therefore, an operating frequency band of the primary card includes a 5G frequency band and a 4G frequency band.

When the secondary card is connected to the 5G NSA network and the ENDC link is activated, the secondary card may establish dual connectivity with NR and LTE. Therefore, an operating frequency band of the secondary card includes a 5G frequency band and a 4G frequency band.

S304. The terminal device determines whether signal strength of the secondary card is less than a preset threshold.

S305. The terminal device determines whether a frequency band combination of the two cards is in a blacklist.

Based on S304 and S305, when determining that the frequency band combination of the two cards is in the blacklist and the signal strength of the secondary card is less than the preset threshold, the terminal device continues to perform the following step S306.

S306. The terminal device initiates an SCG failure (SCG failure) procedure to the NSA network.

S307. The terminal device receives an SCG release (SCG release) message delivered by the NSA network.

S308. The terminal device releases the ENDC link of the primary card.

S309. The terminal device suppresses the primary card from adding the ENDC link.

Specifically, when the frequency band combination including the 5G frequency band and the 4G frequency band of the primary card and the 5G frequency band and the 4G frequency band of the secondary card is in the blacklist, and signal quality of the secondary card is less than the preset threshold, the terminal device initiates the SCG failure procedure, triggers the network to release the ENDC link of the primary card, and suppresses the primary card from adding the ENDC link.

S310. The operating frequency band of the primary card changes.

When the established ENDC link of the primary card is released, the operating frequency band of the primary card changes. The 5G NR frequency band is disabled, and the 4G frequency band is reserved for continued use. In this way, the frequency band combination including the 5G frequency band and the 4G frequency band of the primary card and the 5G frequency band and the 4G frequency band of the secondary card changes to a frequency band combination including the 4G frequency band of the primary card and the 5G frequency band and the 4G frequency band of the secondary card.

S311. The terminal device determines whether the frequency band combination of the two cards is still in the blacklist.

If the changed frequency band combination of the two cards (the 4G frequency band of the primary card+the 5G frequency band and the 4G frequency band of the secondary card) is not in the blacklist, the terminal device continues to perform the following step S312. If the changed frequency band combination of the two cards is still in the blacklist, the terminal device continues to perform S313.

S312. The terminal device allows the primary card to add the ENDC link.

Specifically, when the frequency band combination including the 4G frequency band of the primary card and the 5G frequency band and the 4G frequency band of the secondary card is not in the blacklist, the terminal device triggers to stop suppression of addition of the ENDC link. Therefore, the primary card is allowed to establish a new ENDC link and continue to use the 5G frequency band, to restore an NR capability.

S313. If the changed frequency band combination of the two cards is still in the blacklist, release the ENDC link of the secondary card.

S314. The terminal device suppresses the secondary card from adding the ENDC link.

Specifically, when the frequency band combination including the 4G frequency band of the primary card and the 5G frequency band and the 4G frequency band of the secondary card is in the blacklist, and the signal quality of the secondary card is less than the preset threshold, the terminal device initiates the SCG failure procedure, triggers the network to release the ENDC link of the secondary card, and suppresses the secondary card from adding the ENDC link.

S315. The operating frequency band of the secondary card changes.

When the established ENDC link of the secondary card is released, the operating frequency band of the secondary card changes. The 5G NR frequency band is disabled, and the 4G frequency band is reserved for continued use. In this way, the frequency band combination including the 4G frequency band of the primary card and the 5G frequency band and the 4G frequency band of the secondary card changes to a frequency band combination including the 4G frequency band of the primary card and the 4G frequency band of the secondary card.

S316. The terminal device determines whether the frequency band combination of the two cards is still in the blacklist.

If the changed frequency band combination of the two cards (the 4G frequency band of the primary card+the 4G frequency band of the secondary card) is not in the blacklist, the terminal device continues to perform the following step S317. If the changed frequency band combination of the two cards is still in the blacklist, the terminal device returns to continue to perform S315.

S317. The terminal device allows the primary card and/or the secondary card to add the ENDC link.

Specifically, when the changed frequency band combination (the 4G frequency band of the primary card+the 4G frequency band of the secondary card) is not in the blacklist, the terminal device triggers to stop suppression of addition of the ENDC link, and then allows the primary card to add the ENDC link and/or allows the secondary card to add the ENDC link, in other words, allows the primary card and/or the secondary card to use the 5G frequency band, to restore an NR capability.

In the solution provided in Embodiment 3, in the scenario in which both the primary card and the secondary card in the terminal device are registered with the 5G NSA network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the ENDC link of the primary card is released, and the primary card is suppressed from adding the ENDC link, to improve the signal quality of the secondary card. Further, when the frequency band combination of the two cards changes and the changed frequency band combination of the two cards is still in the blacklist, the ENDC link of the secondary card may be released, and the secondary card is suppressed from adding the ENDC link, to exit the blacklist. Further, when the frequency band combination of the two cards changes and the changed frequency band combination of the two cards is not in the blacklist, suppression of addition of the ENDC link of the primary card and/or the secondary card is stopped to restore the NR capability, to ensure signal quality of the two cards, so as to avoid a problem that basic experience of a user is affected due to a problem frequency band combination.

It should be noted that for ease of description, in the foregoing embodiment, description is provided by using an example in which the ENDC link of the primary card is first released, and then the ENDC link of the secondary card is released, to perform fallback of the NR capability, so as to exit the blacklist. As shown in a dotted line box in FIG. 5A, FIG. 5B, and FIG. 5C, a related process of releasing the ENDC link of the primary card is described in steps S308 to S312, and a related process of releasing the ENDC link of the secondary card is described in steps S313 to S317.

In actual implementation, when the frequency band combination of the two cards is in the blacklist, and the signal quality of the secondary card is less than the preset threshold, it may be specifically determined, based on an actual use requirement, whether the ENDC link of the primary card is first released and then the ENDC link of the secondary card is released, the ENDC link of the secondary card is first released and then the ENDC link of the primary card is released, or the ENDC link of the primary card and the ENDC link of the secondary card are simultaneously released, to perform fallback of the NR capability, so as to exit the blacklist. This is not limited in this embodiment of this application.

The frequency band control method in an abnormal scenario of a dual-card terminal provided in the embodiments of this application is described above by using examples for a scenario in which a 5G network mode is an NSA mode. For a scenario in which the 5G network mode is an SA mode, specific implementations of the frequency band control method in an abnormal scenario of a dual-card terminal provided in the embodiments of this application are described below in detail by using Embodiment 4, Embodiment 5, and Embodiment 6 and with reference to FIG. 6A, FIG. 6B, FIG. 7A, FIG. 7B, FIG. 8A, FIG. 8B, and FIG. 8C.

Embodiment 4

Figure 6A:
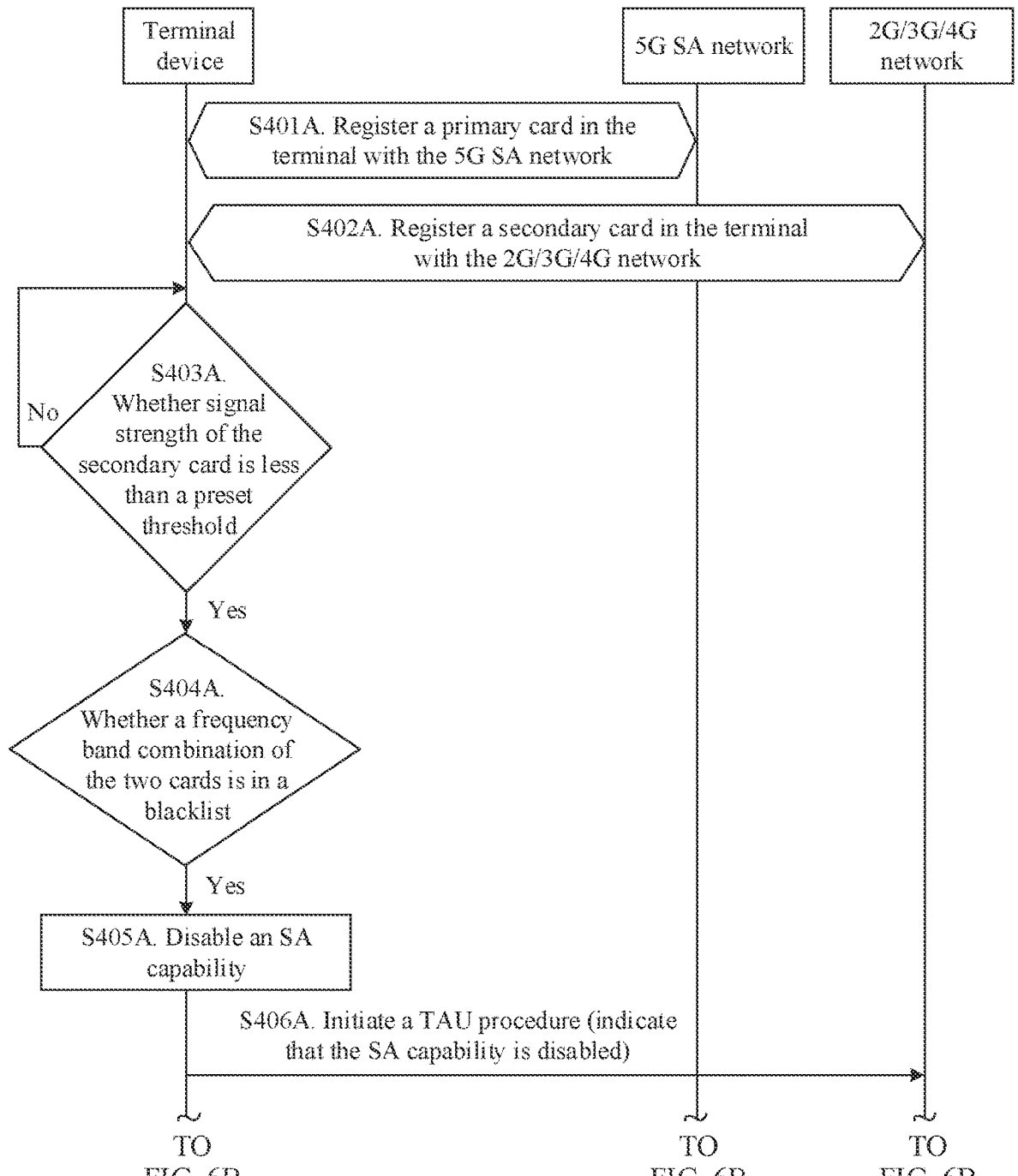
FIG. 6A and FIG. 6B are a first schematic flowchart of a frequency band control method in an abnormal scenario of a dual-card terminal in a scenario in which a terminal device is registered with an SA network according to an embodiment of this application.
Figure 6B:
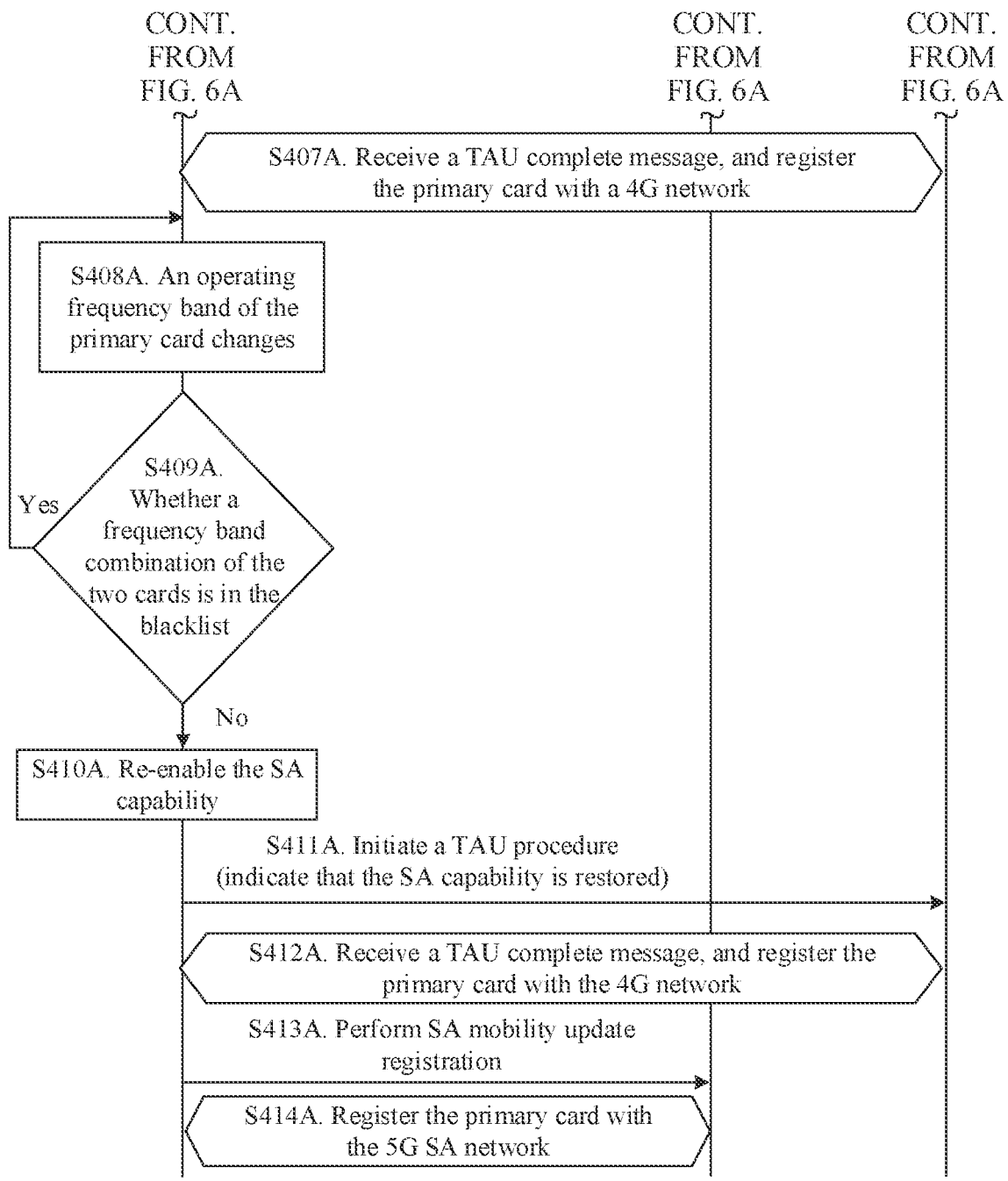

FIG. 6A and FIG. 6B are a signaling flowchart of a frequency band control method in an abnormal scenario of a dual-card terminal according to this embodiment of this application for a scenario in which a primary card camps on a 5G SA network and a secondary card camps on a 2G/3G/4G network. The method specifically includes the following steps S401A to S414A.

S401A. Register the primary card in a terminal device with the 5G SA network.

In a process of being connected to the 5G SA network, the terminal device is first connected to a 5G base station, and then is attached to and registered with a 5GC.

Specifically, the terminal device may first send a registration request (registration request) to the 5G SA network. The registration request carries information such as a capability, a registration type, and a security parameter of the terminal device. The capability of the terminal device may include information indicating whether a handover (handover) to an evolved packet system (evolved packet system. EPS) is supported, information indicating whether a redirection (redirect) to an EPS is supported, and the like. Then, the 5G SA network verifies an identity of the terminal device based on information provided by the terminal device. After verification succeeds, if accepting the registration request of the terminal device, the 5G SA network feeds back a registration accept message (registration accept) to the terminal device.

After being connected to the 5G SA network, the terminal device may communicate with the 5GC, and use various services provided by the 5GC.

When the primary card is registered with the 5G SA network, an operating frequency band of the primary card is a 5G frequency band.

S402A. Register the secondary card in the terminal device with the 2G/3G/4G network.

When the secondary card is registered with the 2G network, an operating frequency band of the secondary card is a 2G frequency band. When the secondary card is registered with the 3G network, an operating frequency band of the secondary card is a 3G frequency band. When the secondary card is registered with the 4G network, an operating frequency band of the secondary card is a 4G frequency band.

S403A. The terminal device determines whether signal strength of the secondary card is less than a preset threshold.

When the signal strength of the secondary card is less than the preset threshold, the dual-card terminal device is in an abnormal scenario.

S404A. The terminal device determines whether a frequency band combination of the two cards is in a blacklist.

Based on S403A and S404A, when determining that the frequency band combination of the two cards is in the blacklist and the signal strength of the secondary card is less than the preset threshold, the terminal device continues to perform the following step S405A.

It is assumed that the operating frequency band of the primary card is NR N28, and the operating frequency band of the secondary card is LTE B40. It may be learned, with reference to Table 1, that the blacklist includes (NR N28+LTE B40). Therefore, the terminal device may determine the frequency band combination (NR N28+LTE B40) of the two cards is in the blacklist.

S405A. The terminal device disables an SA capability.

When the frequency band combination including the 5G frequency band of the primary card and the 2G/3G/4G frequency band of the secondary card is in the blacklist, and signal quality of the secondary card is less than the preset threshold, the terminal device triggers to disable the SA capability, and searches for a 2G/3G/4G network of a lower standard (a 4G network is used below as an example) for registration.

S406A. The terminal device initiates a TAU procedure to the 4G network, and indicates that the SA capability is disabled.

S407A. The terminal device receives a TAU complete message delivered by the 4G network, and registers the primary card with the 4G network.

For example, that the primary card is registered with the 4G network means that when the SA capability is disabled, the terminal device may be independently connected to a 4G base station, and register the primary card with an EPC.

Specifically, the terminal device initiates the TAU procedure, and notifies the 5G network of information change. An AMF in a core network of the 5G network may migrate context of the terminal device to an MME in the 4G network by using an N26 interface.

In some embodiments, in a process of falling back to the 4G LTE network, the terminal device sends network capability (network capability) information to the EPC (for example, the MME). The network capability information is used to indicate that the terminal device does not support 5G or an SA networking mode. In this manner, the EPC considers that the terminal device does not support 5G or the SA networking mode, and therefore does not trigger the terminal device to be handed over from the LTE network to the 5G SA network.

In other embodiments, after being connected to the LTE network, the terminal device may suppress reporting of an NR-related B1 event and/or B2 event, to prevent the terminal device from being handed over from the LTE network to the 5G SA network again. After reporting of the NR-related B1 event and/or B2 event is suppressed, the terminal device does not report the NR-related B1 event and/or B2 event even if a reporting condition is met currently. In this way, a case in which the terminal device is handed over from the LTE network to the 5G SA network again under trigger of the EPC after falling back from the 5G SA network to the LTE network may be avoided.

The NR-related B1 event and B2 event are events used to initiate a handover to a different system. Herein, the different system is a 5G system. Specifically, when quality of a neighboring cell in the 5G SA network is greater than an absolute threshold 4, the terminal device reports the NR-related B1 event. When quality of a serving cell in the currently connected LTE network is less than an absolute threshold 5, and the quality of the neighboring cell in the different system is greater than an absolute threshold 6, the terminal device reports the NR-related B2 event. That is, after the terminal device reports the NR-related B1 event or B2 event to the EPC, the EPC triggers the terminal device to be handed over from the LTE network to the 5G SA network. In this embodiment of this application, reporting of the NR-related B1 event and/or B2 event may be suppressed, to prevent the terminal device from being handed over from the LTE network to the 5G SA network again.

S408A. The operating frequency band of the primary card changes.

When the primary card falls back from the 5G network to the 4G network, the operating frequency band of the primary card changes. Correspondingly, the frequency band combination including the 5G frequency band of the primary card and the 2G/3G/4G frequency band of the secondary card changes to a frequency band combination including a 4G frequency band of the primary card and the 2G/3G/4G frequency band of the secondary card.

For example, if the operating frequency band of the primary card changes from NR N28 to LTE B3, the frequency band combination of the two cards changes from (NR N28+LTE B40) to (LTE B3+LTE B40).

S409A. The terminal device determines whether the frequency band combination of the two cards is still in the blacklist.

If the changed frequency band combination of the two cards is not in the blacklist, the terminal device continues to perform the following step S410A. If the frequency band combination of the two cards is still in the blacklist, the terminal device returns to continue to perform S408A.

For example, it may be learned, with reference to Table 1, that the blacklist does not include (LTE B3+LTE B40). Therefore, the frequency band combination of the two cards is not in the blacklist, and the foregoing frequency band control policy is executed, to correspondingly improve the signal quality of the secondary card in the terminal device. In this way, a case in which signal quality deteriorates because the dual-card terminal device works on a problem frequency band combination can be alleviated.

S410A. The terminal device re-enables the SA capability.

Specifically, when the changed frequency band combination (the 4G frequency band of the primary card+the 2G/3G/4G frequency band of the secondary card) is not in the blacklist, it indicates that the current frequency band combination is no longer a problem frequency band combination, and the terminal device may re-enable the SA capability of the primary card.

S411A. The terminal device initiates a TAU procedure to the 4G network, and indicates that the SA capability is restored.

S412A. The terminal device receives a TAU complete message delivered by the 4G network, and registers the primary card with the 4G network.

In some embodiments, in the TAU procedure, the terminal device sends network capability (network capability) information to the EPC (for example, the MME), and the network capability information is used to indicate that the terminal device supports 5G and the SA networking mode. In this manner, the EPC considers that the terminal device supports 5G and SA networking mode.

S413A. The terminal device sends a mobility update registration request to the 5G SA network.

After the SA capability is restored, the terminal device may redirect the primary card through reselection or hand over the primary card to the 5G SA network by using a mobility method. When determining that a specific condition is met (network quality of the 5G SA network is better than network quality of the LTE network), the terminal device triggers the terminal device to be handed over from the LTE network to the 5G SA network.

S414A. The terminal device receives a mobility update registration complete message, and re-registers the primary card with the 5G SA network.

Specifically, when the changed frequency band combination (the 4G frequency band of the primary card+the 2G/3G/4G frequency band of the secondary card) is not in the blacklist, the terminal device restores the SA capability, and is re-registered with the 5G SA network, to restore an NR capability.

In the solution provided in Embodiment 4, in the scenario in which the primary card in the terminal device is registered with the 5G SA network and the secondary card is registered with the 2G/3G/4G network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the SA capability is disabled, and the primary card is registered with the 2G/3G/4G network, to improve the signal quality of the secondary card. Further, when the frequency band combination of the two cards changes and the changed frequency band combination of the two cards is not in the blacklist, the SA capability may be restored, and the primary card is re-registered with the 5G SA network to restore the NR capability, to ensure signal quality of the two cards, so as to avoid a problem that basic experience of a user is affected due to a problem frequency band combination.

Embodiment 5

Figure 7A:
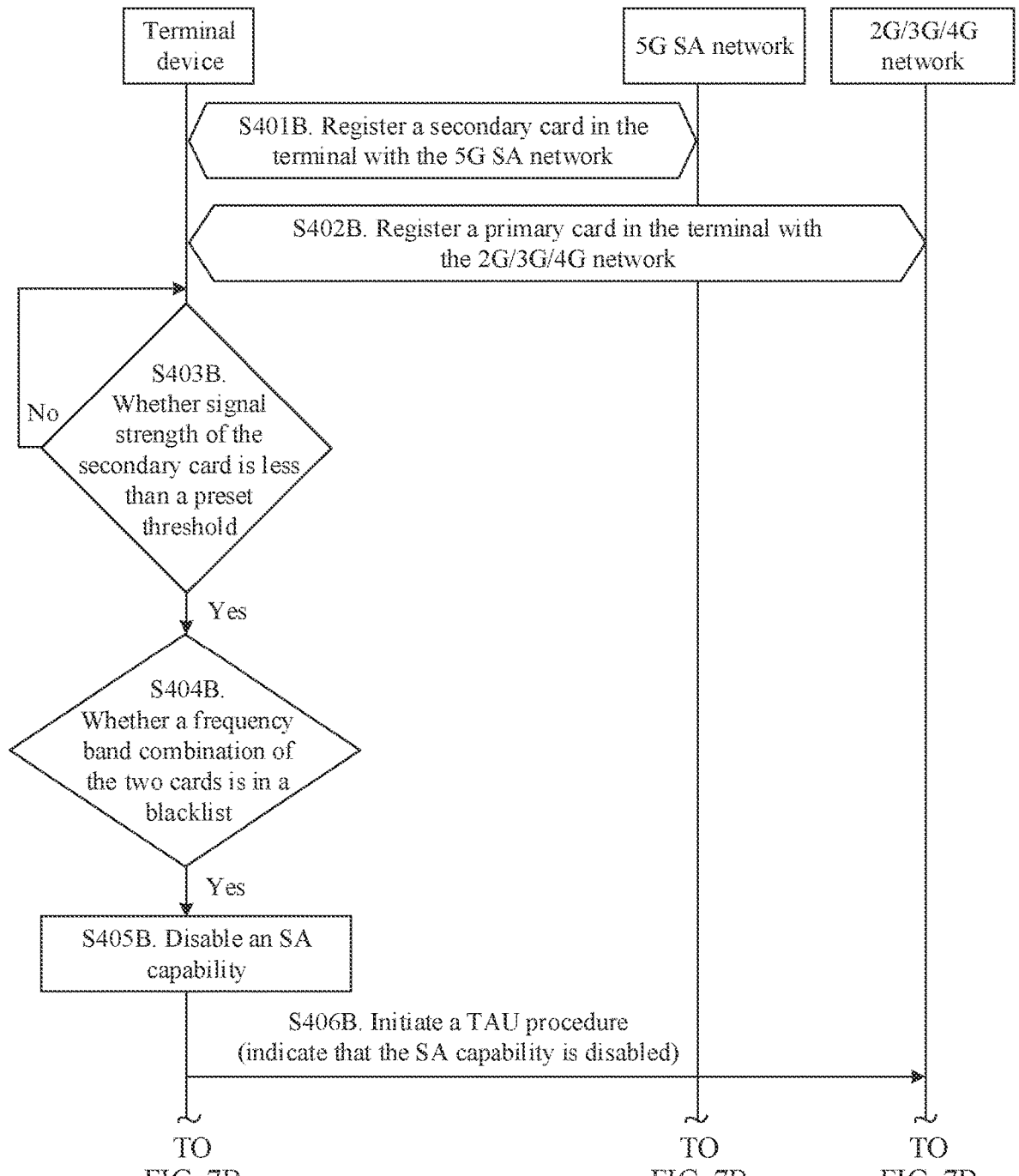
FIG. 7A and FIG. 7B are a second schematic flowchart of a frequency band control method in an abnormal scenario of a dual-card terminal in a scenario in which a terminal device is registered with an SA network according to an embodiment of this application.
Figure 7B:
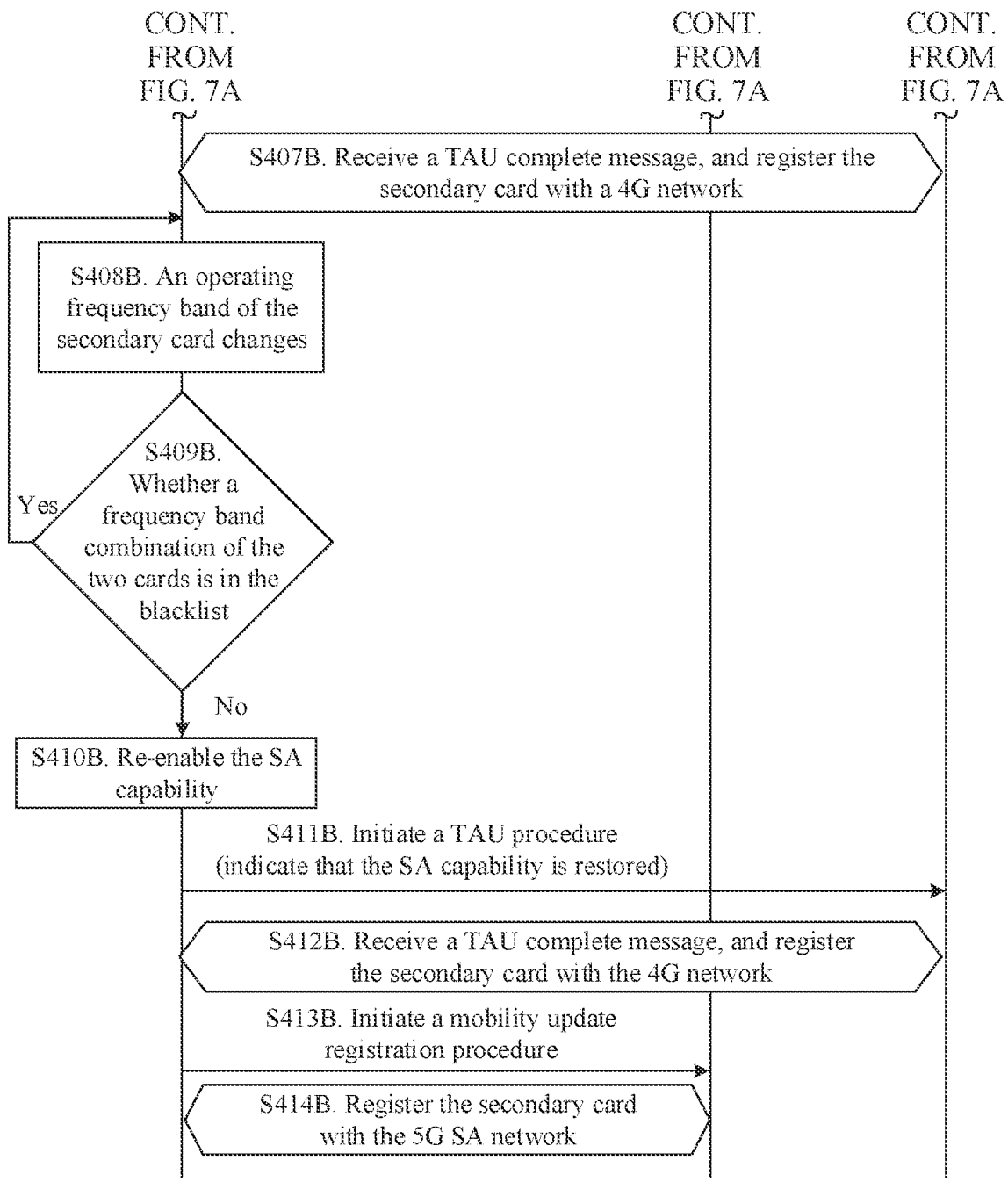

FIG. 7A and FIG. 7B are a signaling flowchart of a frequency band control method m an abnormal scenario of a dual-card terminal according to this embodiment of this application for a scenario in which a secondary card camps on a 5G SA network and a primary card camps on a 2G/3G/4G network. The method specifically includes the following steps S401B to S414B.

S401B. Register the secondary card in a terminal device with the 5G SA network.

When the secondary card is registered with the 5G SA network, an operating frequency band of the secondary card is a 5G frequency band.

S402B. Register the primary card in the terminal device with the 2G/3G/4G network.

When the primary card is registered with the 2G network, an operating frequency band of the primary card is a 2G frequency band. When the primary card is registered with the 3G network, an operating frequency band of the primary card is a 3G frequency band. When the primary card is registered with the 4G network, an operating frequency band of the primary card is a 4G frequency band.

S403B. The terminal device determines whether signal strength of the secondary card is less than a preset threshold.

S404B. The terminal device determines whether a frequency band combination of the two cards is in a blacklist.

Based on S403B and S404B, when determining that the frequency band combination of the two cards is in the blacklist and the signal strength of the secondary card is less than the preset threshold, the terminal device continues to perform the following step S405B.

S405B. The terminal device disables an SA capability.

When the frequency band combination including the 2G/3G/4G frequency band of the primary card and the 5G frequency band of the secondary card is in the blacklist, and signal quality of the secondary card is less than the preset threshold, the terminal device triggers to disable the SA capability of the secondary card, and searches for a 2G/3G/4G network of a lower standard (a 4G network is used below as an example) for registration.

S406B. The terminal device initiates a TAU procedure to the 4G network, and indicates that the SA capability of the secondary card is disabled.

S407B. The terminal device receives a TAU complete message delivered by the 4G network, and registers the secondary card with the 4G network.

S408B. The operating frequency band of the secondary card changes.

When the secondary card falls back from the 5G network to the 4G network, the operating frequency band of the secondary card changes. Correspondingly, the frequency band combination including the 2G/3G/4G frequency band of the primary card and the 5G frequency band of the secondary card changes to a frequency band combination including the 2G/3G/4G frequency band of the primary card and a 4G frequency band of the secondary card.

S409B. The terminal device determines whether the frequency band combination of the two cards is still in the blacklist.

If the changed frequency band combination of the two cards is not in the blacklist, the terminal device continues to perform the following step S410B. If the frequency band combination of the two cards is still in the blacklist, the terminal device returns to continue to perform S408B.

S410B. The terminal device re-enables the SA capability of the secondary card.

Specifically, when the changed frequency band combination (the 2G/3G/4G frequency band of the primary card+the 4G frequency band of the secondary card) is not in the blacklist, it indicates that the current frequency band combination is no longer a problem frequency band combination, and the terminal device may re-enable the SA capability of the secondary card.

S411B. The terminal device initiates a TAU procedure to the 4G network, and indicates that the SA capability is enabled.

S412B. The terminal device receives a TAU complete message delivered by the 4G network, and registers the secondary card with the 4G network.

S413B. The terminal device sends a mobility update registration request to the 5G SA network.

After the SA capability is restored, the terminal device may redirect the secondary card through reselection or hand over the secondary card to the 5G SA network by using a mobility method.

S414B. The terminal device receives a mobility update registration complete message from the 5G SA network, and registers the secondary card with the 5G SA network.

Specifically, when the changed frequency band combination (the 2G/3G/4G frequency band of the primary card+the 4G frequency band of the secondary card) is not in the blacklist, the terminal device re-enables the SA capability of the secondary card, and re-registers the secondary card with the 5G SA network, to restore an NR capability.

For implementation processes of S401B to S414B in Embodiment 5, refer to detailed description of S401A to S414A in Embodiment 4. Details are not described herein.

In the solution provided in Embodiment 5, in the scenario in which the secondary card in the terminal device is registered with the 5G SA network and the primary card is registered with the 2G/3G/4G network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the SA capability is disabled, and the secondary card is registered with the 2G/3G/4G network, to improve the signal quality of the secondary card. Further, when the frequency band combination of the two cards changes and the changed frequency band combination of the two cards is not in the blacklist, the SA capability may be restored, and the secondary card is re-registered with the 5G SA network to restore the NR capability, to ensure signal quality of the two cards, so as to avoid a problem that basic experience of a user is affected due to a problem frequency band combination.

Embodiment 6

Figure 8A:
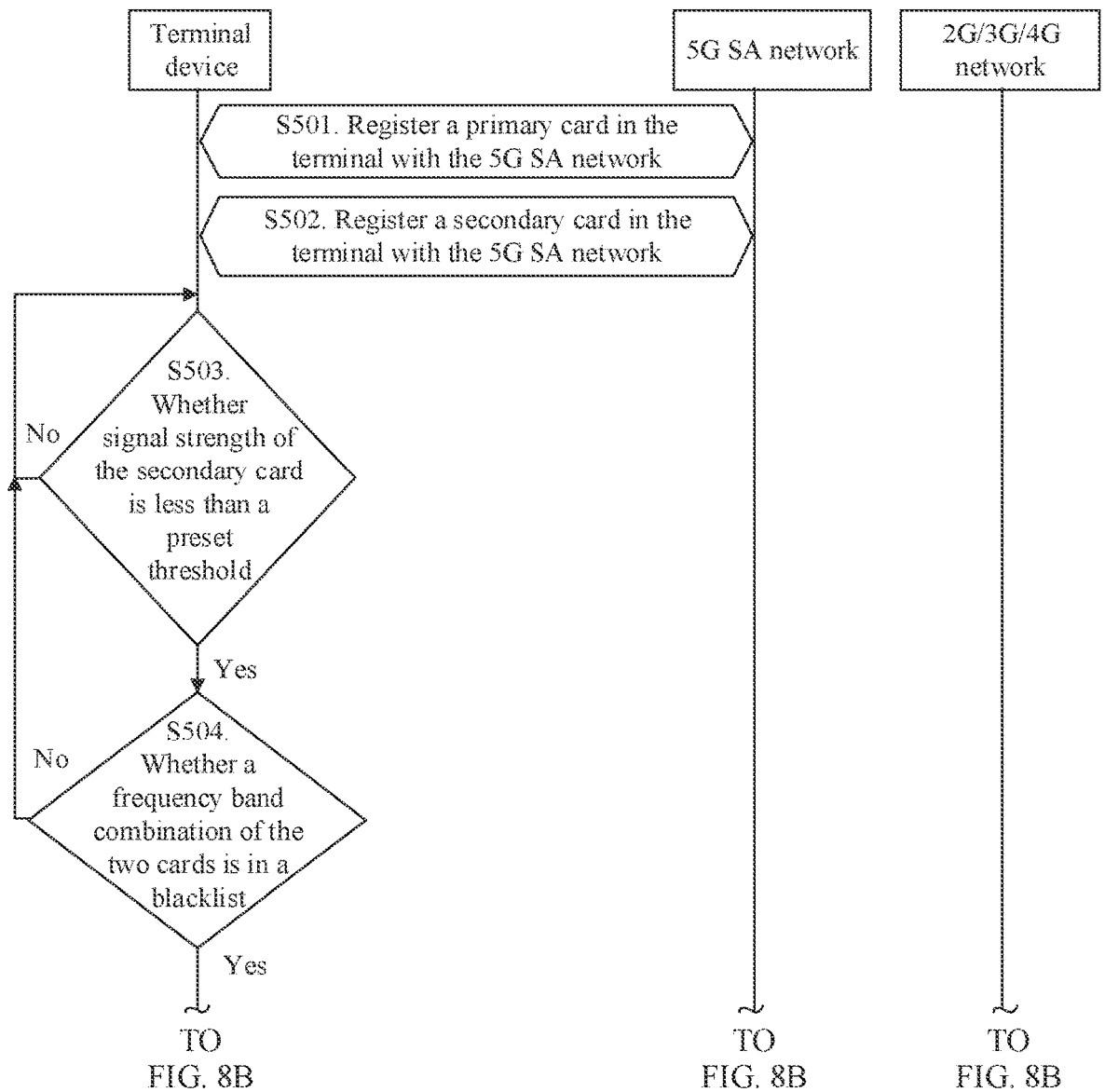
FIG. 8A, FIG. 8B, and FIG. 8C are a third schematic flowchart of a frequency band control method in an abnormal scenario of a dual-card terminal in a scenario in which a terminal device is registered with an SA network according to an embodiment of this application.
Figure 8B:
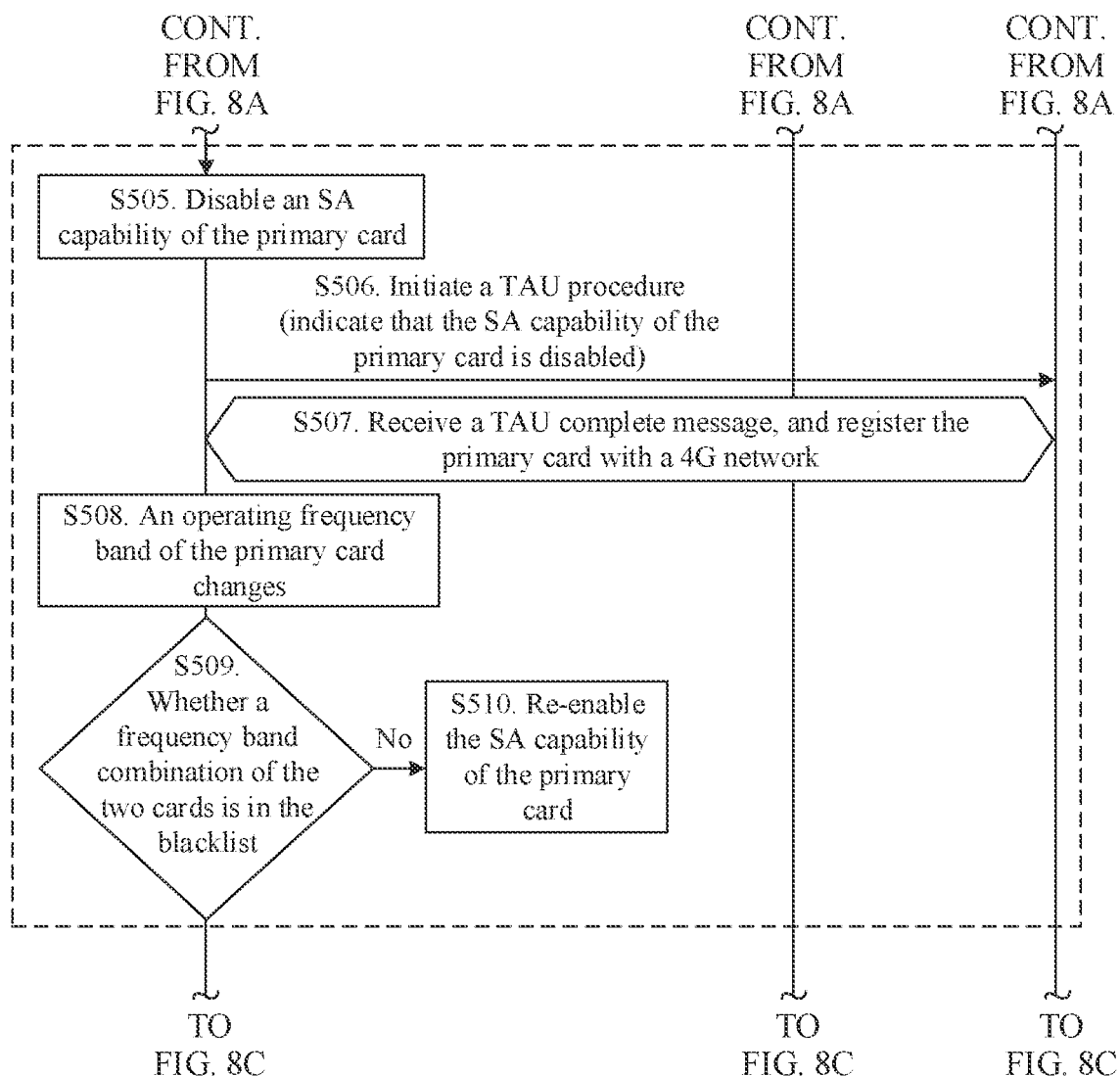
Figure 8C:
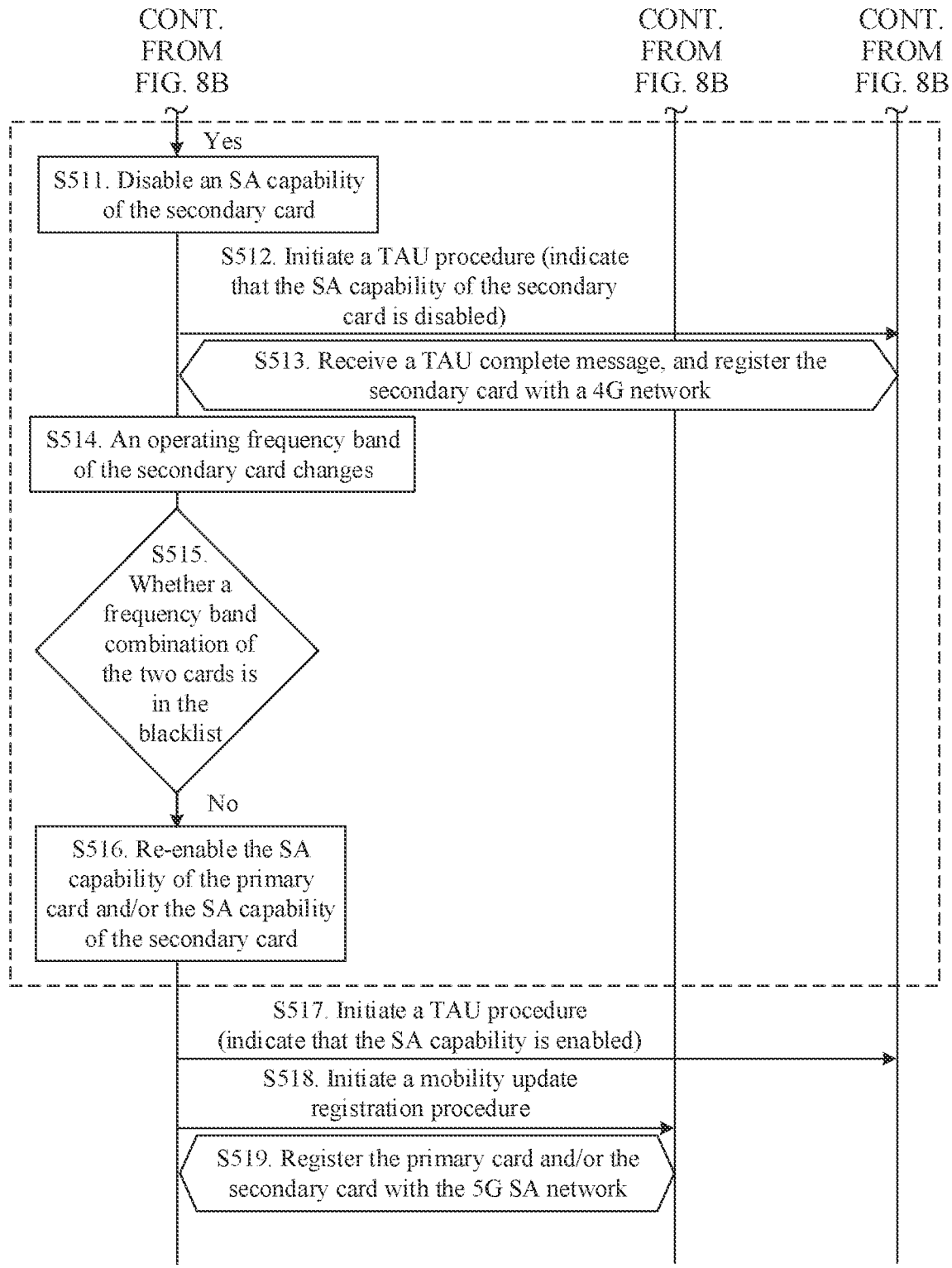

FIG. 8A, FIG. 8B, and FIG. 8C are a signaling flowchart of a frequency band control method in an abnormal scenario of a dual-card terminal according to this embodiment of this application for a scenario in which both a primary card and a secondary card camp on a 5G SA network. The method specifically includes the following steps S501 to S519.

S501. Register the primary card in a terminal device with the 5G SA network.

When the primary card is registered with the 5G SA network, an operating frequency band of the primary card is a 5G frequency band.

S502. Register the secondary card in the terminal device with the 5G SA network.

When the secondary card is registered with the 5G SA network, an operating frequency band of the secondary card is a 5G frequency band.

S503. The terminal device determines whether signal strength of the secondary card is less than a preset threshold.

S504. The terminal device determines whether a frequency band combination of the two cards is in a blacklist.

Based on S503 and S504, when determining that the frequency band combination of the two cards is in the blacklist and the signal strength of the secondary card is less than the preset threshold, the terminal device continues to perform the following step S505.

S505. The terminal device disables an SA capability of the primary card.

When the frequency band combination including the 5G frequency band of the primary card and the 5G frequency band of the secondary card is in the blacklist, and signal quality of the secondary card is less than the preset threshold, the terminal device triggers to disable the SA capability of the primary card, and searches for a 2G/3G/4G network of a lower standard (a 4G network is used below as an example) for registration.

S506. The terminal device initiates a TAU procedure to the 4G network, and indicates that the SA capability of the primary card is disabled.

S507. The terminal device receives a TAU complete message delivered by the 4G network, and registers the primary card with the 4G network.

S508. The operating frequency band of the primary card changes.

When the primary card falls back from the 5G network to the 4G network, the operating frequency band of the primary card changes. Correspondingly, the frequency band combination including the 5G frequency band of the primary card and the 5G frequency band of the secondary card changes to a frequency band combination including a 4G frequency band of the primary card and the 5G frequency band of the secondary card.

S509. The terminal device determines whether the frequency band combination of the two cards (the 4G frequency band of the primary card+the 5G frequency band of the secondary card) is still in the blacklist.

S510. If the changed frequency band combination of the two cards is not in the blacklist, the terminal device re-enables the SA capability of the primary card.

Further, after the SA capability is restored, the terminal device may redirect the primary card through reselection or hand over the primary card to the 5G SA network by using a mobility method. For ease of description, this step is not shown in FIG. 8A, FIG. 8B, and FIG. 8C.

S511. If the changed frequency band combination of the two cards is still in the blacklist, the terminal device disables an SA capability of the secondary card.

When the SA capability of the secondary card is disabled, the 5G NR frequency band of the secondary card is disabled.

S512. The terminal device initiates a TAU procedure to the 4G network, and indicates that the SA capability of the secondary card is disabled.

S513. The terminal device receives a TAU complete message delivered by the 4G network, and registers the secondary card with the 4G network.

S514. The operating frequency band of the secondary card changes.

When the secondary card falls back from the 5G network to the 4G network, the operating frequency band of the secondary card changes. Correspondingly, the frequency band combination including the 4G frequency band of the primary card and the 5G frequency band of the secondary card changes to a frequency band combination including the 4G frequency band of the primary card and a 4G frequency band of the secondary card.

S515. The terminal device determines whether the frequency band combination of the two cards is still in the blacklist.

If the changed frequency band combination of the two cards is not in the blacklist, the terminal device continues to perform the following step S516. If the changed frequency band combination of the two cards is still in the blacklist, the method ends.

S516. The terminal device restores the SA capability of the primary card and/or the SA capability of the secondary card.

When the frequency band combination including the 4G frequency band of the primary card and the 4G frequency band of the secondary card is not in the blacklist, it indicates that the current frequency band combination is no longer a problem frequency band combination, and the terminal device may re-enable the SA capability of the primary card and the SA capability of the secondary card.

S517. The terminal device initiates a TAU procedure to the 4G network, and indicates that the SA capability is enabled.

Further, after the SA capability is restored, the terminal device may redirect the primary card and/or the secondary card through reselection or hand over the primary card and/or the secondary card to the 5G SA network by using a mobility method.

S518. The terminal device sends a mobility update registration request to the 5G SA network.

S519. The terminal device receives a mobility update registration complete message from the 5G SA network, and registers the primary card and the secondary card with the 5G SA network.

When the changed frequency band combination (the 4G frequency band of the primary card+the 4G frequency band of the secondary card) is not in the blacklist, the terminal device re-enables the SA capability of the primary card and the SA capability of the secondary card, and registers the primary card and the secondary card with the 5G SA network, to restore an NR capability.

In the solution provided in Embodiment 6, in the scenario in which the primary card in the terminal device is registered with the 5G SA network and the primary card is registered with the 5G SA network, a corresponding processing policy may be executed by determining whether the frequency band combination of the two cards is in the blacklist and whether the signal quality of the secondary card is less than the preset threshold. If the frequency band combination of the two cards is in the blacklist and the signal quality of the secondary card is less than the preset threshold, fallback of the NR capability is performed, for example, the SA capability of the primary card is disabled, and the primary card is registered with the 2G/3G/4G network, to improve the signal quality of the secondary card. Further, when the frequency band combination of the two cards changes and the changed frequency band combination of the two cards is still in the blacklist, fallback of the NR capability is performed again, for example, the SA capability of the secondary card is disabled, and the secondary card is registered with the 2G/3G/4G network, to exit the blacklist. Further, when the frequency band combination of the two cards changes and the changed frequency band combination of the two cards is not in the blacklist, the SA capability of the primary card and/or the SA capability of the secondary card may be restored, and the primary card and/or the secondary card may be re-registered with the 5G SA network to restore the NR capability, to ensure signal quality of the two cards, so as to avoid a problem that basic experience of a user is affected due to a problem frequency band combination.

It should be noted that for ease of description, in the foregoing embodiment, description is provided by using an example in which the SA capability of the primary card is first disabled, and then the SA capability of the secondary card is disabled, to perform fallback of the NR capability, so as to exit the blacklist. As shown in a dotted line box in FIG. 8A, FIG. 8B, and FIG. 8C, a related process of disabling the SA capability of the primary card is described in steps S505 to S510, and a related process of disabling the SA capability of the secondary card is described in steps S511 to S516.

In actual implementation, when the frequency band combination of the two cards is in the blacklist, and the signal quality of the secondary card is less than the preset threshold, it may be specifically determined, based on an actual use requirement, whether the SA capability of the primary card is first disabled and then the SA capability of the secondary card is disabled, the SA capability of the secondary card is first disabled and then the SA capability of the primary card is disabled, or the SA capability of the primary card and the SA capability of the secondary card are simultaneously disabled, to perform fallback of the NR capability, so as to exit the blacklist. This is not limited in this embodiment of this application.

It should be noted that for an abnormal scenario of the dual-card terminal device, the embodiments of this application include but are not limited to the foregoing cases shown in Table 2, in other words, include but are not limited to Embodiment 1 to Embodiment 6, and may further include another possible scenario, for example, a scenario in which a primary card and a secondary card respectively camp on a 5G SA network and a 5G NSA network. These scenarios may be implemented based on the solutions described by using specific examples in the embodiments of this application. For example, for a dual-card user scenario that supports a 5G SA mode and a 5G NSA mode, if the primary card and the secondary card respectively camp on the 5G SA network and the 5G NSA network, in the embodiments of this application, it may be determined whether a frequency band combination of the two cards is in a blacklist and whether signal quality of the primary card and/or signal quality of the secondary card are/is less than a preset threshold. If the frequency band combination of the two cards is in the blacklist and the signal quality of the primary card and/or the signal quality of the secondary card are/is less than the preset threshold, an NR capability of the terminal device is controlled to fall back, for example, an SA capability is disabled and/or an NR link in an ENDC link is released, to improve the signal quality of the two cards.

It should also be noted that in the embodiments of this application, "greater than" may be replaced with "greater than or equal to", and "less than or equal to" may be replaced with "less than", or "greater than or equal to" may be replaced with "greater than", and "less than" may be replaced with "less than or equal to".

The embodiments described in this specification may be independent solutions, or may be combined based on internal logic. These solutions fall within the protection scope of this application.

It may be understood that the methods and operations implemented by the terminal device in the method embodiments may be implemented by a component (for example, a chip or a circuit) that can be used in the terminal device.

The method embodiments provided in this application are described above, and apparatus embodiments provided in this application are described below. It should be understood that description of the apparatus embodiments corresponds to the description of the method embodiments. Therefore, for content that is not described in detail, refer to the method embodiments. For brevity, details are not described herein.

The solutions provided in the embodiments of this application are mainly described above from a perspective of method steps. It may be understood that to implement the foregoing functions, the terminal device implementing the method includes a hardware structure and/or a software module corresponding to each function. A person skilled in the art should be aware that the example units, algorithms, and steps described with reference to the embodiments disclosed in this specification can be implemented in this application by using hardware or a combination of hardware and computer software. Whether a function is performed by hardware or hardware driven by computer software depends on particular applications and design constraints of the technical solutions. A person skilled in the art may use different methods to implement the described functions for each specific application, but it should not be considered that the implementation goes beyond the protection scope of this application.

In the embodiments of this application, the terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, module division is an example, and is merely logical function division. In actual implementation, there may be another division manner. Description is provided below by using an example in which each functional module is obtained through division based on each corresponding function.

To better implement the frequency band control method in an abnormal scenario of a dual-card terminal provided in the embodiments of this application, an embodiment of this application further provides a corresponding apparatus.

Figure 9:
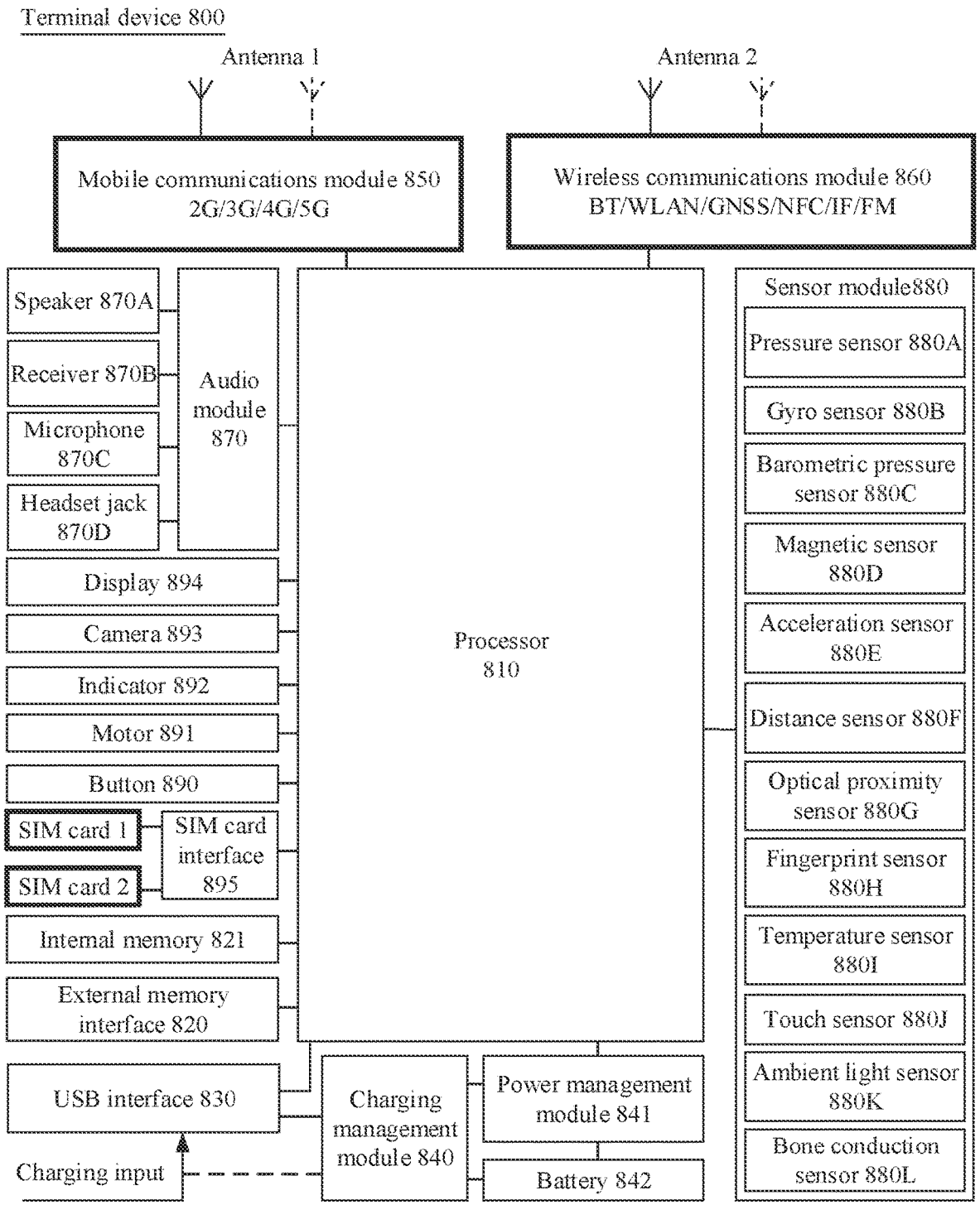
FIG. 9 is a schematic diagram of a structure of a terminal device according to an embodiment of this application.

FIG. 9 is a schematic diagram of a structure of a terminal device 800 according to an embodiment of this application. The terminal device 800 may be the terminal device described in the foregoing embodiments.

The terminal device 800 may include a processor 810, an external memory interface 820, an internal memory 821, a universal serial bus (universal serial bus. USB) interface 830, a charging management module 840, a power management module 841, a battery 842, an antenna 1, an antenna 2, a mobile communications module 850, a wireless communications module 860, an audio module 870, a speaker 870A, a telephone receiver 870B, a microphone 870C, a headset jack 870D, a sensor module 880, a button 890, a motor 891, an indicator 892, a camera 893, a display 894, a subscriber identification module (subscriber identification module, SIM) card interface 895, and the like. The sensor module 880 may include a pressure sensor 880A, a gyro sensor 880B, a barometric pressure sensor 880C, a magnetic sensor 880D, an acceleration sensor 880E, a distance sensor 880F, an optical proximity sensor 880G, a fingerprint sensor 880H, a temperature sensor 880I, a touch sensor 880J, an ambient light sensor 880K, a bone conduction sensor 880L, and the like.

It may be understood that the structure shown in this embodiment of this application constitutes no specific limitation on the terminal device 800. The terminal device 800 may include more or fewer components than shown in the figure, or combine some components, split some components, or have a different component arrangement. The components shown in the figure may be implemented by hardware, software, or a combination of software and hardware.

The processor 810 may include one or more processing units. For example, the processor 810 may include an application processor (application processor, AP), a modem processor (modem), a graphics processing unit (graphics processing unit, GPU), an image signal processor (image signal processor. ISP), a controller, a video codec, a digital signal processor (digital signal processor, DSP), a baseband processor, and/or a neural-network processing unit (neural-network processing unit, NPU). Different processing units may be independent components, or may be integrated into one or more processors. A memory may further be disposed in the processor 810 to store instructions and data.

A wireless communications function of the terminal device 800 may be implemented by using the antenna 1, the antenna 2, the mobile communications module 850, the wireless communications module 860, the modem processor, the baseband processor, and the like.

The antenna 1 and the antenna 2 are configured to transmit and receive an electromagnetic wave signal. Each antenna in the terminal device 800 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 850 may provide a solution to wireless communication such as 2G/3G/4G/5G applied to the terminal device 800. The mobile communications module 850 may include at least one filter, a switch, a power amplifier, a low noise amplifier (low noise amplifier, LNA), and the like. The mobile communications module 850 may receive an electromagnetic wave through the antenna 1, perform processing such as filtering and amplification on the received electromagnetic wave, and transmit the electromagnetic wave to the modem processor for demodulation. The mobile communications module 850 may further amplify a signal modulated by the modem processor, and convert the signal into an electromagnetic wave for radiation through the antenna 1. In some embodiments, at least some of functional modules of the mobile communications module 850 may be disposed in the processor 810. In some embodiments, at least some of functional modules of the mobile communications module 850 may be disposed in a same device as at least some of modules of the processor 810.

The modem processor may include a modulator and a demodulator. The modulator is configured to modulate a to-be-sent low frequency baseband signal into a medium or high frequency signal. The demodulator is configured to demodulate a received electromagnetic wave signal into a low frequency baseband signal. The demodulator then transfers the demodulated low frequency baseband signal to the baseband processor for processing. The low frequency baseband signal is processed by the baseband processor, and then is transferred to the application processor. The application processor outputs a sound signal by using an audio device (not limited to the speaker 870A, the receiver 870B, or the like), or displays an image or a video by using the display 894. In some embodiments, the modem processor may be an independent device. In some other embodiments, the modem processor may be independent of the processor 810, and is disposed in a same device as the mobile communications module 850 or another functional module. In some embodiments, the terminal device 800 may include two modem processors. One processor corresponds to 4G, and the other processor corresponds to 5G.

The wireless communications module 860 may provide a solution to wireless solution such as a wireless local area network (wireless local area networks. WLAN) (for example, a wireless fidelity (wireless fidelity, Wi-Fi) network) and bluetooth (bluetooth, BT) applied to the terminal device 800. The wireless communications module 860 may be one or more devices into which at least one communications processing module is integrated. The wireless communications module 860 receives an electromagnetic wave through the antenna 2, modulates and filters an electromagnetic wave signal, and sends the processed signal to the processor 810. The wireless communications module 860 may further receive a to-be-sent signal from the processor 810, modulate and amplify the signal, and convert the signal into an electromagnetic wave for radiation through the antenna 2.

In some embodiments, the antenna 1 of the terminal device 800 is coupled to the mobile communications module 850, and the antenna 2 is coupled to the wireless communications module 860, so that the terminal device 800 may communicate with a network and another device by using a wireless communications technology. The wireless communications technology may include GSM, GPRS, CDMA, WCDMA, TD-SCDMA, LTE, NR, BT, WLAN, NFC, FM, an IR technology, and/or the like.

In this embodiment of this application, the wireless communications module 860 is configured to connect two SIM cards to a 5G SA network, or connect one SIM card to a 5G SA network and the other SIM card to an LTE network under instruction of the processor. In some embodiments, for a dual-card user scenario that supports a 5G SA mode or a 5G NSA mode, the processor determines whether a frequency band combination of the two cards is in a blacklist and whether signal quality of a secondary card is less than a preset threshold. If the frequency band combination of the two cards is in the blacklist and the signal quality of the secondary card is less than the preset threshold, an NR capability of the terminal device is controlled to fall back, for example, an SA capability is disabled or an NR link in an ENDC link is released, to improve the signal quality of the secondary card. Further, when the frequency band combination of the two cards changes and a changed frequency band combination of the two cards is not in the blacklist, the NR capability of the terminal device is controlled to be restored, for example, the SA capability is re-enabled or addition of the ENDC link is allowed, to ensure signal quality of the two cards, so as to alleviate a case in which signal quality deteriorates because the dual-card terminal device works on a problem frequency band combination. For specific operations implemented by the wireless communications module 860, refer to related description in the foregoing embodiments. Details are not described herein.

The terminal device 800 implements a display function by using the GPU, the display 894, the application processor, and the like. The GPU is a microprocessor for image processing, and is connected to the display 894 and the application processor. The GPU is configured to perform mathematical and geometric calculation, and is configured to perform graphics rendering. The processor 810 may include one or more GPUs that execute program instructions to generate or change display information.

The display 894 is configured to display an image, a video, and the like. The display 894 includes a display panel.

The terminal device 800 may implement a photographing function by using the ISP, the camera 893, the video codec, the GPU, the display 894, the application processor, and the like. The ISP is configured to process data fed back by the camera 893. The camera 893 is configured to capture a static image or a video. The digital signal processor is configured to process a digital signal, and may further process another digital signal in addition to a digital image signal. For example, when the terminal device 800 selects a frequency, the digital signal processor is configured to perform Fourier Transform on frequency energy. The video codec is configured to compress or decompress a digital video.

The internal memory 821 may be configured to store computer-executable program code. The executable program code includes instructions. The internal memory 821 may include a program storage area and a data storage area. The program storage area may store an operating system, an application program required by at least one function (for example, a sound play function or an image play function), and the like.

The terminal device 800 may implement an audio function, for example, music play and recording, by using the audio module 870, the speaker 870A, the receiver 870B, the microphone 870C, the headset jack 870D, the application processor, and the like.

The pressure sensor 880A is configured to sense a pressure signal, and may convert the pressure signal into an electrical signal. In some embodiments, the pressure sensor 880A may be disposed on the display 894.

The touch sensor 880J is also referred to as a "touch panel". The touch sensor 880J may be disposed on the display 894, and the touch sensor 880J and the display 894 form a touchscreen, which is also referred to as a "touchscreen". The touch sensor 8803 is configured to detect a touch operation performed on or near the touch sensor 880J. The touch sensor may transfer the detected touch operation to the application processor, to determine a touch event type. A visual output related to the touch operation may be provided by using the display 894. In some other embodiments, the touch sensor 880J may be disposed on a surface of the terminal device 800, and is located at a position different from that of the display 894.

The SIM card interface 895 is configured to be connected to a SIM card, for example, a SIM card 1 and a SIM card 2. The SIM card may be inserted into the SIM card interface 895 or removed from the SIM card interface 895, to come into contact with and be separated from the terminal device 800. The terminal device 800 may support one or N SIM card interfaces, where N is a positive integer greater than 1. The SIM card interface 895 may support a nano SIM card, a micro SIM card, a SIM card, and the like. A plurality of cards may be simultaneously inserted into a same SIM card interface 895. The plurality of cards may be of a same type or different types. The SIM card interface 895 may be compatible with different types of SIM cards. The SIM card interface 895 may also be compatible with an external storage card. The terminal device 800 interacts with a network by using the SIM card, to implement functions such as a call and data communication. In some embodiments, the terminal device 800 uses an eSIM, namely, an embedded SIM card. The eSIM card may be embedded in the terminal device 800, and cannot be separated from the terminal device 800.

In this embodiment of this application, the SIM card is configured to store user information, and the user information may include an IMSI. The terminal device 800 may be registered with the network by using the user information as an identity.

The terminal device 800 in this embodiment of this application may be a smartphone (for example, a mobile phone equipped with an Android system or an iOS system), a tablet, a notebook computer, a palmtop computer, a mobile internet device (MID, mobile internet device), a wearable device (for example, a smart watch or a smart band), or another device that can access the Internet.

Figure 10:
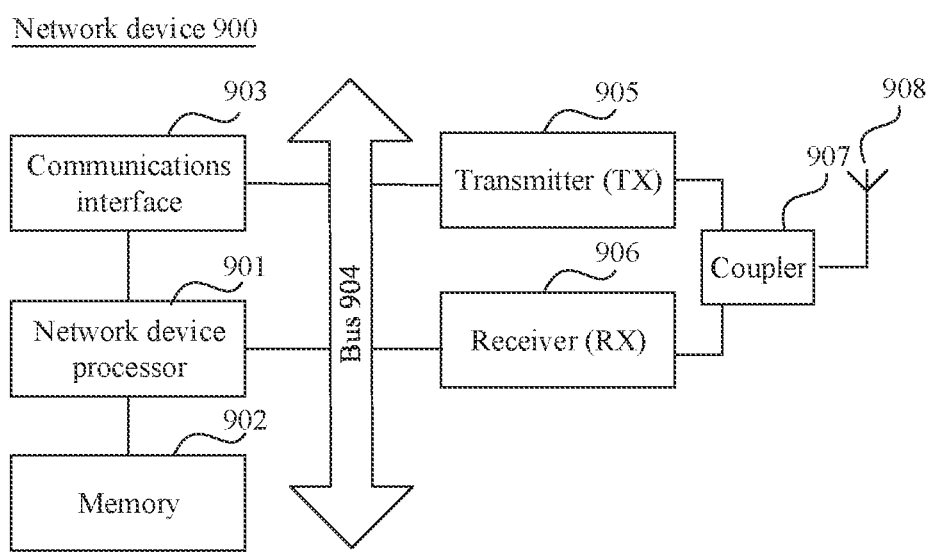
FIG. 10 is a schematic diagram of a structure of a network device according to an embodiment of this application.

FIG. 10 is a schematic diagram of a structure of a network device 900 according to an embodiment of this application. In some embodiments, the network device 900 may be the 5G base station in the foregoing embodiments. In some other embodiments, the network device 900 may be the 4G base station in the foregoing embodiments.

As shown in FIG. 10, the network device 900 may include one or more processors 901, a memory 902, a communications interface 903, a transmitter 905, a receiver 906, a coupler 907, and an antenna 908. These components may be connected by using a bus 904 or in another manner. In FIG. 10, an example in which the components are connected by using the bus is used.

The communications interface 903 may be used by the network device 900 to communicate with another communications device such as a terminal device, a 5GC, or another network device. Specifically, the communications interface 903 may be a communications interface in 5G or future new radio. This is not limited to a wireless communications interface. A wired communications interface 903 may be configured for the terminal device 900, to support wired communications. For example, a backhaul link between a network device 900 and another network device 900 may be a wired communications connection.

In some embodiments of this application, the transmitter 905 and the receiver 906 may be considered as a wireless modem.

The transmitter 905 may be configured to transmit a signal output by the processor 901. The receiver 906 may be configured to receive a signal. In the network device 900, there may be one or more transmitters 905 and receivers 906. The antenna 908 may be configured to convert electromagnetic energy on a transmission line into an electromagnetic wave in free space, or convert an electromagnetic wave in free space into electromagnetic energy on a transmission line. The coupler 907 may be configured to: divide a mobile communications signal into a plurality of channels, and allocate the mobile communications signal to a plurality of receivers 906. It may be understood that the antenna 908 of the network device may be implemented as a large-scale antenna array.

The memory 902 is coupled to the processor 901, and is configured to store various software programs and/or a plurality of groups of instructions. Specifically, the memory 902 may include a high-speed random access memory, and may further include a non-volatile memory, for example, one or more disk storage devices, a flash memory device, or another non-volatile solid-state storage device.

The memory 902 may store an operating system (which is referred to as a system below), for example, an embedded operating system such as uCOS, VxWorks, and RTLinux. The memory 902 may further store a network communications program, and the network communications program may be configured to communicate with one or more additional devices, one or more terminal devices, and one or more network devices.

In this embodiment of this application, the processor 901 may be configured to read and execute computer-readable instructions. Specifically, the processor 901 may be configured to: invoke the program stored in the memory 902, for example, a program of implementing, on a side of the network device 900, the frequency band control method in an abnormal scenario of a dual-card terminal provided in the one or more embodiments of this application, and execute instructions included in the program.

It should be noted that the network device 900 shown in FIG. 10 is merely an implementation in this embodiment of this application. In actual application, the network device 900 may include more or fewer components. This is not limited herein.

The implementations of this application may be combined randomly to achieve different technical effects.

Optionally, in some embodiments, an embodiment of this application further provides a computer-readable medium. The computer-readable medium stores program code. When the computer program code runs on a computer, the computer is enabled to perform the method in the foregoing aspects.

Optionally, in some embodiments, an embodiment of this application further provides a computer program product. The computer program product includes computer program code. When the computer program code runs on a computer, the computer is enabled to perform the method in the foregoing aspects.

In the embodiments of this application, the terminal device or the network device includes a hardware layer, an operating system layer that runs at the hardware layer, and an application layer that runs at the operating system layer. The hardware layer may include hardware such as a central processing unit (central processing unit, CPU), a memory management unit (memory management unit, MMU), and a memory (also referred to as a main memory). An operating system at the operating system layer may be any one or more computer operating systems that implement service processing by using a process (process), for example, a Linux operating system, a Unix operating system, an Android operating system, an iOS operating system, or a windows operating system. The application layer may include applications such as a browser, an address book, word processing software, and instant messaging software.

Aspects or features of this application may be implemented as a method, an apparatus, or a product that uses standard programming and/or engineering technologies. The term "product" used in this application may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc. CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable medium" may include but is not limited to a radio channel and various other media that can store, include, and/or carry instructions and/or data.

It should be understood that the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, RAM may be used as an external cache. For example but not for limitation, the RAM may include the following a plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should be further noted that the memory described in this specification is intended to include but is not limited to these memories and any other proper types of memories.

A person skilled in the art may be aware that the example units and steps described with reference to the embodiments disclosed in this specification can be implemented by using electronic hardware or a combination of computer software and electronic hardware. Whether these functions are performed by hardware or software depends on particular applications and design constraints of the technical solutions. A person skilled in the art may use different methods to implement the described functions for each specific application, but it should not be considered that the implementation goes beyond the protection scope of this application.

It may be clearly understood by a person skilled in the art that, for convenience and brevity of description, for a specific working process of the system, apparatus, and unit described above, refer to a corresponding process in the foregoing method embodiments. Details are not described herein.

In the several embodiments provided in this application, it should be understood that the disclosed system, apparatus, and method may be implemented in another manner. For example, the described apparatus embodiment is merely an example. For example, the division of the unit is merely logical function division. In actual implementation, there may be another division manner. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical form, a mechanical form, or another form.

The units described as separate components may or may not be physically separate, and the components displayed as units may or may not be physical units, may be located at one position, or may be distributed on a plurality of network units. Some or all of the units may be selected based on an actual requirement to achieve the objectives of the solutions in the embodiments.

In addition, functional units in the embodiments of this application may be integrated into one unit, or each unit may exist alone physically, or two or more units may be integrated into one unit.

When the function is implemented in a form of a software functional unit and sold or used as an independent product, the function may be stored in a computer-readable storage medium. Based on such an understanding, essentially, the technical solutions of this application, or the part contributing to the prior art, or some of the technical solutions may be embodied in a form of a computer software product. The computer software product is stored in a storage medium. The computer software product includes several instructions, and the instructions are used to enable a computer device (which may be a personal computer, a server, or a network device) to perform all or some of the steps of the methods described in the embodiments of this application. The storage medium may include but is not limited to any medium that can store program code, for example, a USB flash drive, a removable hard disk, a ROM, a RAM, a magnetic disk, or an optical disc.

Unless otherwise defined, all technical and scientific terms used in this specification have meanings the same as those commonly understood by a person skilled in the technical field of this application. The terms used in this specification of this application are merely intended to describe specific embodiments, and are not intended to limit this application.

The foregoing descriptions are merely specific implementations of this application, but are not intended to limit the protection scope of this application. Any variation or replacement readily figured out by a person skilled in and familiar with the technical field within the technical scope disclosed in this application shall fall within the protection scope of this application. Therefore, the protection scope of this application shall be subject to the protection scope of the claims.

What is claimed is:

1. A frequency band control method for a dual-card terminal device, wherein the terminal device supports a 5G standalone (SA) mode and/or a non-standalone (NSA) mode, the method comprising:
    forbidding the terminal device from working on a 5G new radio (NR) frequency band when an operating frequency band of a first subscriber identity module card and an operating frequency band of a second subscriber identity module card in the terminal device belong to a preset frequency band combination, and when signal quality of either a) the first subscriber identity module card or b) the second subscriber identity module card does not meet a preset signal quality condition,
    wherein forbidding the terminal device from working on the 5G NR frequency band comprises:
        disabling a 5G SA capability of the terminal device, and registering the terminal device with a first network if the terminal device is in the 5G SA mode, wherein the first network is a 4G, 3G, or 2G network; or
        releasing an NR link in an E-UTRAN NR dual-connectivity (ENDC) link of the terminal device if the terminal device is in the 5G NSA mode.

2. The method of claim 1, wherein after forbidding the terminal device from working on a 5G NR frequency band, the method further comprises:
    determining, when detecting that the operating frequency band of the first subscriber identity module card or the operating frequency band of the second subscriber identity module card changes, whether a changed operating frequency band of the first subscriber identity module card and a changed operating frequency band of the second subscriber identity module card belong to the preset frequency band combination; and
    allowing the terminal device to work on the 5G NR frequency band when the changed operating frequency band of the first subscriber identity module card and the changed operating frequency band of the second subscriber identity module card do not belong to the preset frequency band combination.

3. The method of claim 1, wherein disabling the 5G SA capability of the terminal device, and registering the terminal device with the first network if the terminal device is in the 5G SA mode comprises:
    either c) disabling the 5G SA capability of the first subscriber identity module card, and registering the first subscriber identity module card with the first network when the first subscriber identity module card camps on a 5G SA network, and when the second subscriber identity module card camps on the 4G, 3G, or 2G network; or
    d) disabling a 5G SA capability of a target card, and registering the target card with the first network when both the first subscriber identity module card and the second subscriber identity module card camp on a 5G SA network, wherein the target card is the first subscriber identity module card and/or the second subscriber identity module card.

4. The method of claim 3, wherein disabling the 5G SA capability of the target card, and registering the target card with the first network comprises:
    disabling the 5G SA capability of the first subscriber identity module card, and registering the first subscriber identity module card with the first network;
    determining, when detecting that the operating frequency band of the first subscriber identity module card or the operating frequency band of the second subscriber identity module card changes, whether the operating frequency band of the first subscriber identity module card and the operating frequency band of the second subscriber identity module card still belong to the preset frequency band combination; and
    disabling a 5G SA capability of the second subscriber identity module card, and registering the second subscriber identity module card with the first network when the operating frequency band of the first subscriber identity module card and the operating frequency band of the second subscriber identity module card still belong to the preset frequency band combination.

5. The method of claim 1, wherein releasing the NR link in the ENDC link of the terminal device if the terminal device is in the 5G NSA mode comprises:

either c) releasing an ENDC link corresponding to the first subscriber identity module card when the first subscriber identity module card camps on a 5G NSA network, and when the second subscriber identity module card camps on the 4G, 3G, or 2G network; or d) releasing an NR link in an ENDC link corresponding to at least one of the first subscriber identity module card and the second subscriber identity module card when both the first subscriber identity module card and the second subscriber identity module card camp on a 5G NSA network.

6. The method of claim 5, wherein releasing the ENDC link corresponding to at least one of the first subscriber identity module card and the second subscriber identity module card comprises:

releasing the ENDC link corresponding to the first subscriber identity module card;

determining, when detecting that the operating frequency band of the first subscriber identity module card or the operating frequency band of the second subscriber identity module card changes, whether the operating frequency band of the first subscriber identity module card and the operating frequency band of the second subscriber identity module card still after changing belong to the preset frequency band combination; and releasing an ENDC link corresponding to the second subscriber identity module card when the operating frequency band of the first subscriber identity module card and the operating frequency band of the second subscriber identity module card after changing belong to the preset frequency band combination.

7. The method of claim 1, wherein after releasing the NR link in the ENDC link of the terminal device, the method further comprises forbidding the terminal device from adding a new ENDC link.

8. The method of claim 1, wherein the preset frequency band combination comprises at least one frequency band combination, and one of the at least one frequency band combination comprises a frequency band corresponding to a first network standard and a frequency band corresponding to a second network standard.

9. The method of claim 8, wherein the at least one frequency band combination comprises at least one of following frequency band combinations:

NR N1 and GSM B20;
NR N1 and WCDMA B8;
NR N28 and LTE B40;
NR N78 and CDMA B2;
NR N78 and NR N3; or
LTE B5 and a combination of LTE B3 and NR N41.

10. The method of claim 1, wherein registering the terminal device with the first network comprises registering the terminal device with the first network through handover or redirection.

11. The method of claim 10, wherein registering the terminal device with the first network through handover or redirection comprises:

searching, by the terminal device, for the first network;
initiating, by the terminal device, a tracking area update (TAU) procedure to the first network, and indicating that the 5G SA capability of the terminal device is disabled;
receiving, by the terminal device, a TAU complete message from the first network; and
registering the terminal device with the first network in response to the TAU complete message.

12. The method of claim 1, wherein releasing the ENDC link of the terminal device comprises:

initiating, by the terminal device, a secondary cell group (SCG) failure procedure to a 5G NSA network;
receiving, by the terminal device, an SCG release message from the 5G NSA network; and
releasing, by the terminal device, the NR link in the ENDC link in response to the SCG release message.

13. The method of claim 2, wherein allowing the terminal device to work on the 5G NR frequency band comprises:

re-enabling the 5G SA capability of the terminal device if the terminal device is in the 5G SA mode; or
allowing the terminal device to add the ENDC link if the terminal device is in the 5G NSA mode.

14. The method of claim 13, wherein after re-enabling the 5G SA capability of the terminal device, the method further comprises initiating, by the terminal device, a tracking area update (TAU) procedure to a second network, and indicating that the 5G SA capability of the terminal device is enabled, wherein the second network is a 5G SA network, a 4G network, a 3G network, a 2G network, or a combination thereof.

15. The method of claim 13, wherein after re-enabling the 5G SA capability of the terminal device, the method further comprises re-registering the terminal device with a 5G SA network through handover or redirection.

16. The method of claim 15, wherein re-registering the terminal device with the 5G SA network through handover or redirection comprises:

sending, by the terminal device, a mobility update registration request to the 5G SA network;
receiving, by the terminal device, a mobility update registration complete message from the 5G SA network; and
registering the terminal device with the 5G SA network in response to the mobility update registration complete message.

17. The method of claim 1, wherein the first subscriber identity module card is a primary card and the second subscriber identity module card is a secondary card, or wherein the first subscriber identity module card is a secondary card and the second subscriber identity module card is a primary card.

18. A terminal device, comprising:

a processor; and
a memory coupled to the processor, wherein the memory stores instructions that, when executed by the processor, cause the terminal device to be configured to:
forbidding the terminal device from working on a 5G new radio (NR) frequency band when an operating frequency band of a first subscriber identity module card and an operating frequency band of a second subscriber identity module card in the terminal device belong to a preset frequency band combination, and when signal quality of either a) the first subscriber identity module card or b) the second subscriber identity module card does not meet a preset signal quality condition,
wherein forbidding the terminal device from working on the 5G NR frequency band comprises:
disabling a 5G SA capability of the terminal device, and registering the terminal device with a first network if the terminal device is in a 5G SA mode, wherein the first network is a 4G, 3G, or 2G network; or
releasing an NR link in an E-UTRAN NR dual-connectivity (ENDC) link of the terminal device if the terminal device is in a 5G NSA mode.

19. The terminal device of claim 18, wherein the instructions, when executed by the processor, further cause the terminal device to be configured to:
- determining, when detecting that the operating frequency band of the first subscriber identity module card or the operating frequency band of the second subscriber identity module card changes, whether a changed operating frequency band of the first subscriber identity module card and a changed operating frequency band of the second subscriber identity module card belong to the preset frequency band combination; and
- allowing the terminal device to work on the 5G NR frequency band when the changed operating frequency band of the first subscriber identity module card and the changed operating frequency band of the second subscriber identity module card do not belong to the preset frequency band combination.

20. The terminal device of claim 18, wherein the at least one of the preset frequency band combinations comprises at least one of the following frequency band combinations:
- NR N1 and GSM B20;
- NR N1 and WCDMA B8;
- NR N28 and LTE B40;
- NR N78 and CDMA B2;
- NR N78 and NR N3; or
- LTE B5 and a combination of LTE B3 and NR N41.

* * * * *